United States Patent
Matsui et al.

(10) Patent No.: US 9,124,813 B2
(45) Date of Patent: Sep. 1, 2015

(54) INFORMATION PROCESSING DEVICE USING COMPRESSION RATIO OF STILL AND MOVING IMAGE DATA

(71) Applicant: FUJITSU LIMITED, Kawasaki-shi (JP)

(72) Inventors: Kazuki Matsui, Kawasaki (JP); Kenichi Horio, Yokohama (JP); Ryo Miyamoto, Kawasaki (JP); Tomoharu Imai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 539 days.

(21) Appl. No.: 13/677,437

(22) Filed: Nov. 15, 2012

(65) Prior Publication Data

US 2013/0156100 A1    Jun. 20, 2013

(30) Foreign Application Priority Data

Dec. 20, 2011 (JP) .................................. 2011-278979

(51) Int. Cl.
*H04N 19/12* (2014.01)
*H04N 19/137* (2014.01)
*H04N 19/17* (2014.01)

(52) U.S. Cl.
CPC ........... *H04N 7/26132* (2013.01); *H04N 19/12* (2014.11); *H04N 19/137* (2014.11); *H04N 19/17* (2014.11)

(58) Field of Classification Search
CPC . H04N 7/26132; H04N 19/17; H04N 19/137; H04N 19/12
See application file for complete search history.

(56) References Cited

U.S. PATENT DOCUMENTS

| | | | | |
|---|---|---|---|---|
| 5,379,355 A | * | 1/1995 | Allen | 382/238 |
| 5,600,373 A | * | 2/1997 | Chui et al. | 375/240.1 |
| 5,801,841 A | * | 9/1998 | Suzuki | 382/234 |
| 6,054,943 A | * | 4/2000 | Lawrence | 341/87 |
| 6,285,793 B1 | * | 9/2001 | Hua | 382/239 |
| 6,445,418 B1 | * | 9/2002 | Oh et al. | 375/240.01 |

(Continued)

FOREIGN PATENT DOCUMENTS

| | | |
|---|---|---|
| JP | 2000-050263 A | 2/2000 |
| JP | 2007-043673 A | 2/2007 |

OTHER PUBLICATIONS

Machine English Translation JP2000-333019.*

(Continued)

*Primary Examiner* — Behrooz Senfi
*Assistant Examiner* — Mohammed Jebari
(74) *Attorney, Agent, or Firm* — Fujitsu Patent Center

(57) ABSTRACT

The server device draws a processing result from software in an image memory, detects an update area containing an update between frames in the image, performs still image compression, and calculates the compression ratio of still image compressed data in the update area. The server device identifies a high-frequency change area, performs moving image compression, and calculates the compression ratio of moving image compressed data. The server device transmits the still image compressed data and the moving image compressed data. The server device stops the moving image compression based on the result of comparing the compression ratio of the moving image compressed data and a compression ratio of still image compressed data in a previous update area is the update area in a previous frame detected before the start of the moving image compression and has been detected at a position associated with the high-frequency change area.

7 Claims, 14 Drawing Sheets

(56) References Cited

U.S. PATENT DOCUMENTS

| | | | |
|---|---|---|---|
| 7,161,506 B2* | 1/2007 | Fallon | 341/51 |
| 7,548,657 B2 | 6/2009 | Deaven | |
| 7,715,642 B1* | 5/2010 | Collins et al. | 382/242 |
| 8,565,540 B2* | 10/2013 | Solomon | 382/232 |
| 2002/0029259 A1* | 3/2002 | Okada | 709/219 |
| 2003/0228063 A1* | 12/2003 | Nakayama et al. | 382/251 |
| 2004/0103216 A1* | 5/2004 | Lane | 709/247 |
| 2004/0151390 A1* | 8/2004 | Iwamura | 382/236 |
| 2007/0098082 A1* | 5/2007 | Maeda et al. | 375/240.26 |
| 2008/0069457 A1* | 3/2008 | Matsumoto | 382/232 |
| 2008/0198930 A1* | 8/2008 | Matsubayashi | 375/240.15 |
| 2010/0080475 A1* | 4/2010 | Nishikawa et al. | 382/233 |
| 2010/0135644 A1* | 6/2010 | Taoka | 386/120 |
| 2011/0150072 A1* | 6/2011 | Han | 375/240.01 |
| 2011/0150433 A1* | 6/2011 | Alexandrov et al. | 386/328 |
| 2011/0276653 A1* | 11/2011 | Matsui et al. | 709/217 |
| 2012/0219233 A1* | 8/2012 | Uro et al. | 382/239 |

OTHER PUBLICATIONS

Machine English Translation JP2004-312584.*

* cited by examiner

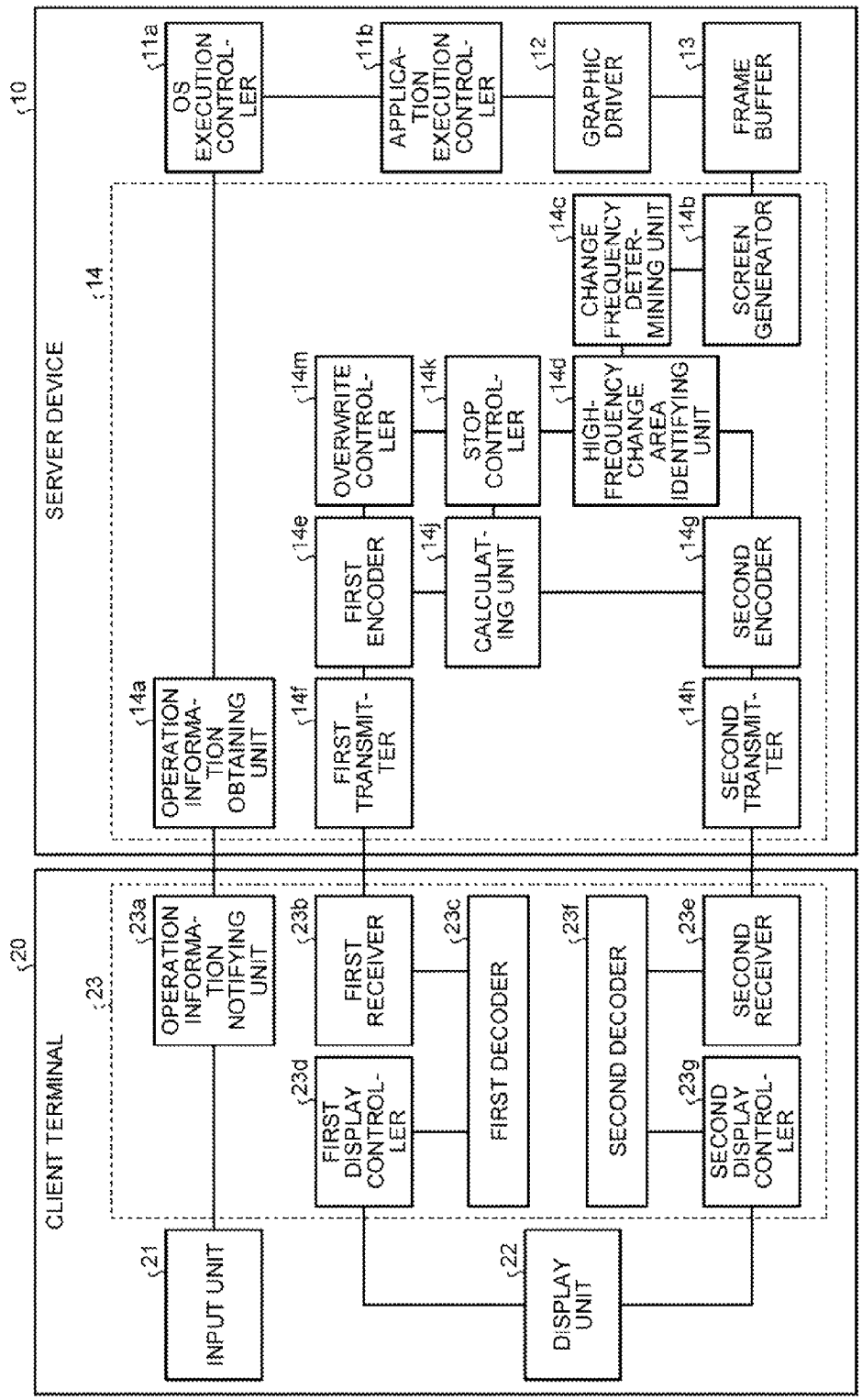

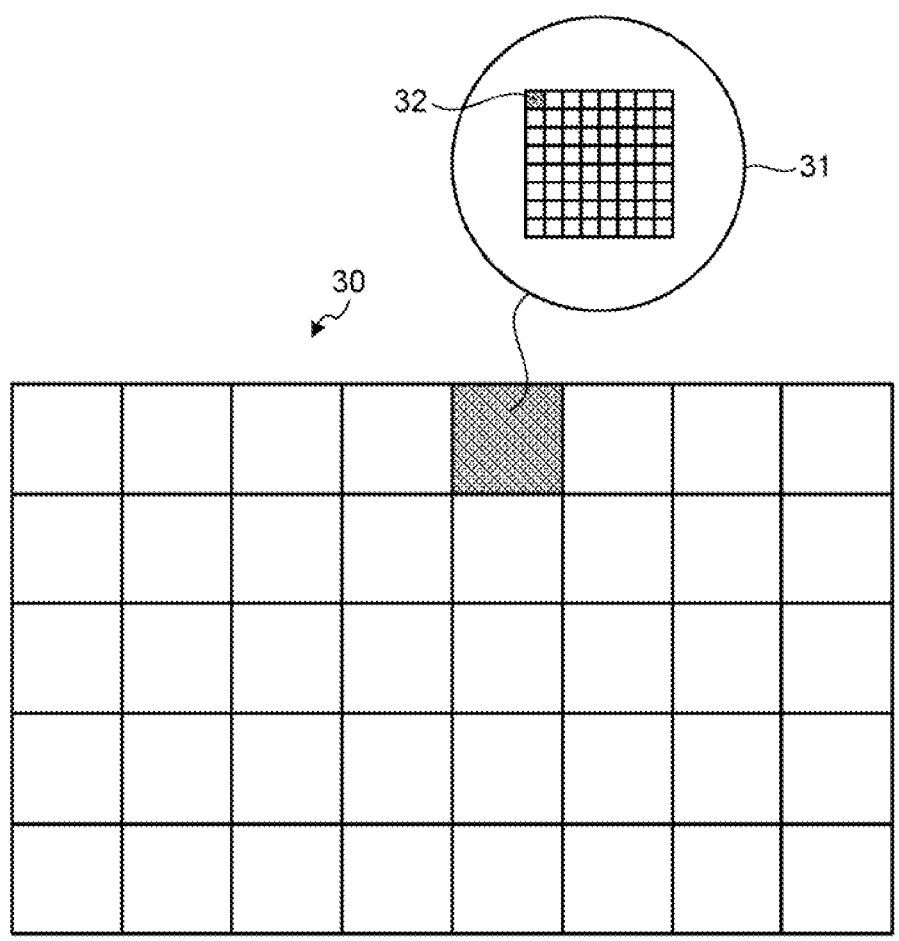

FIG.4
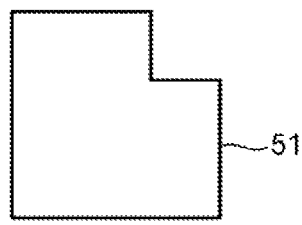
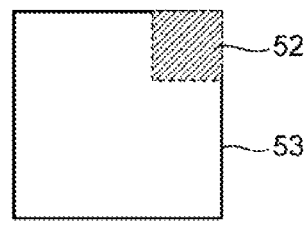
FIG.5
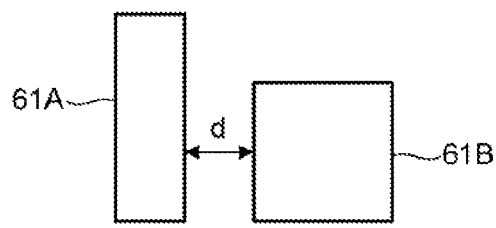
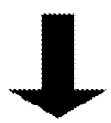
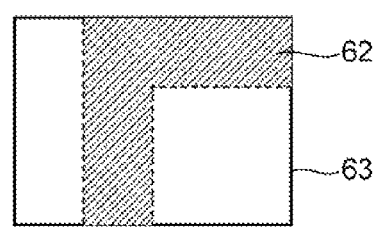

FIG.9
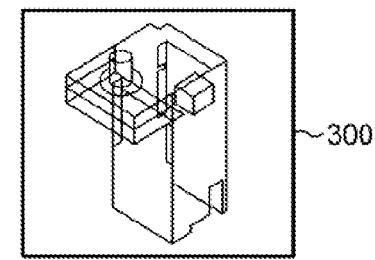
300
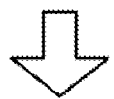
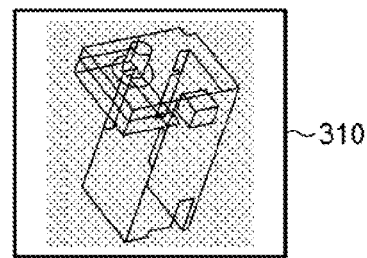
310
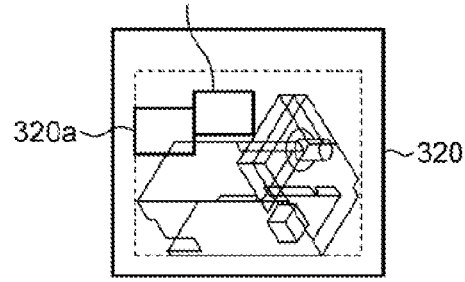
320a, 320b, 320
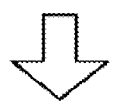
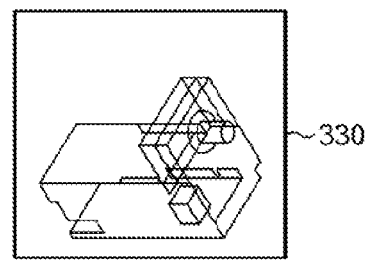
330

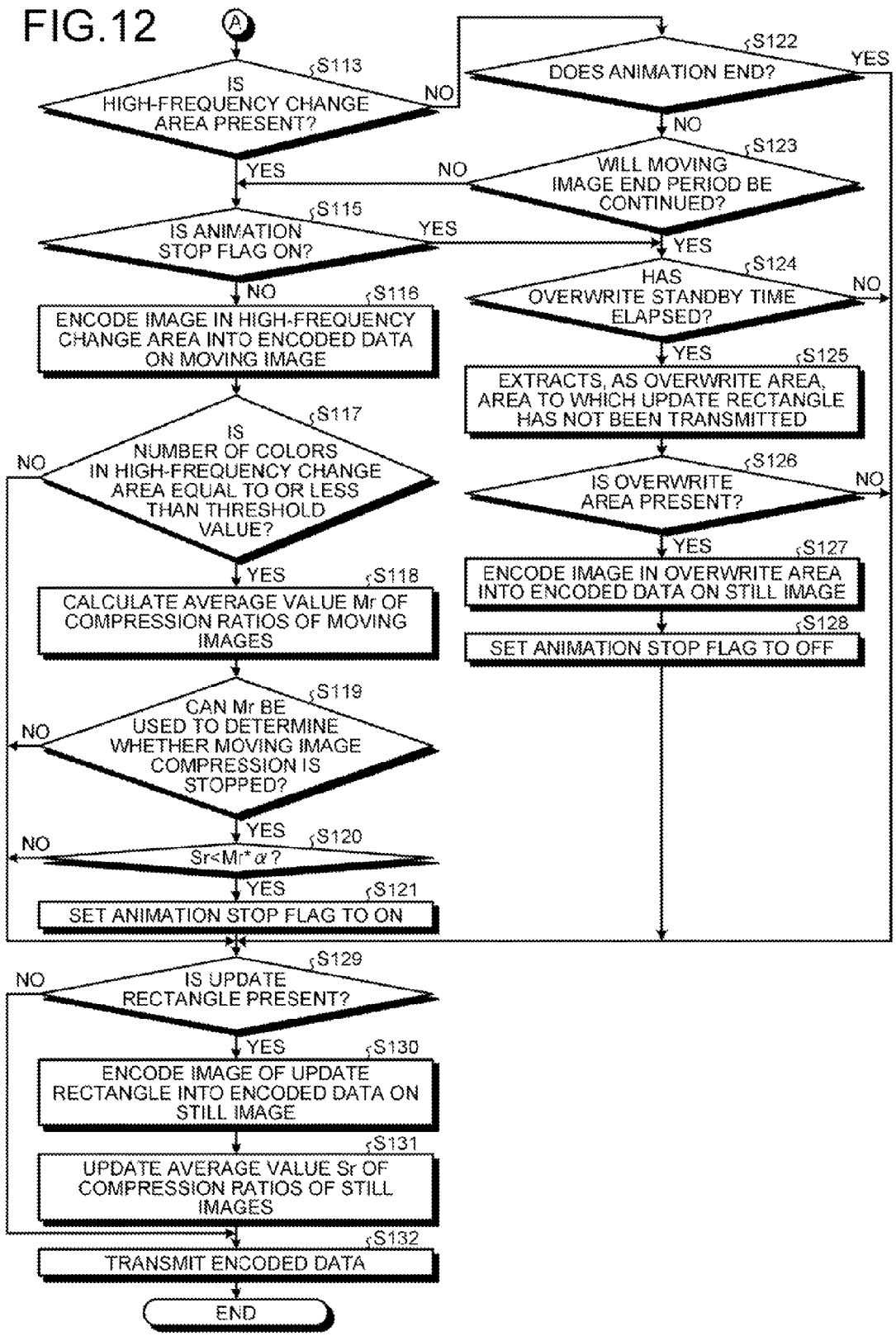

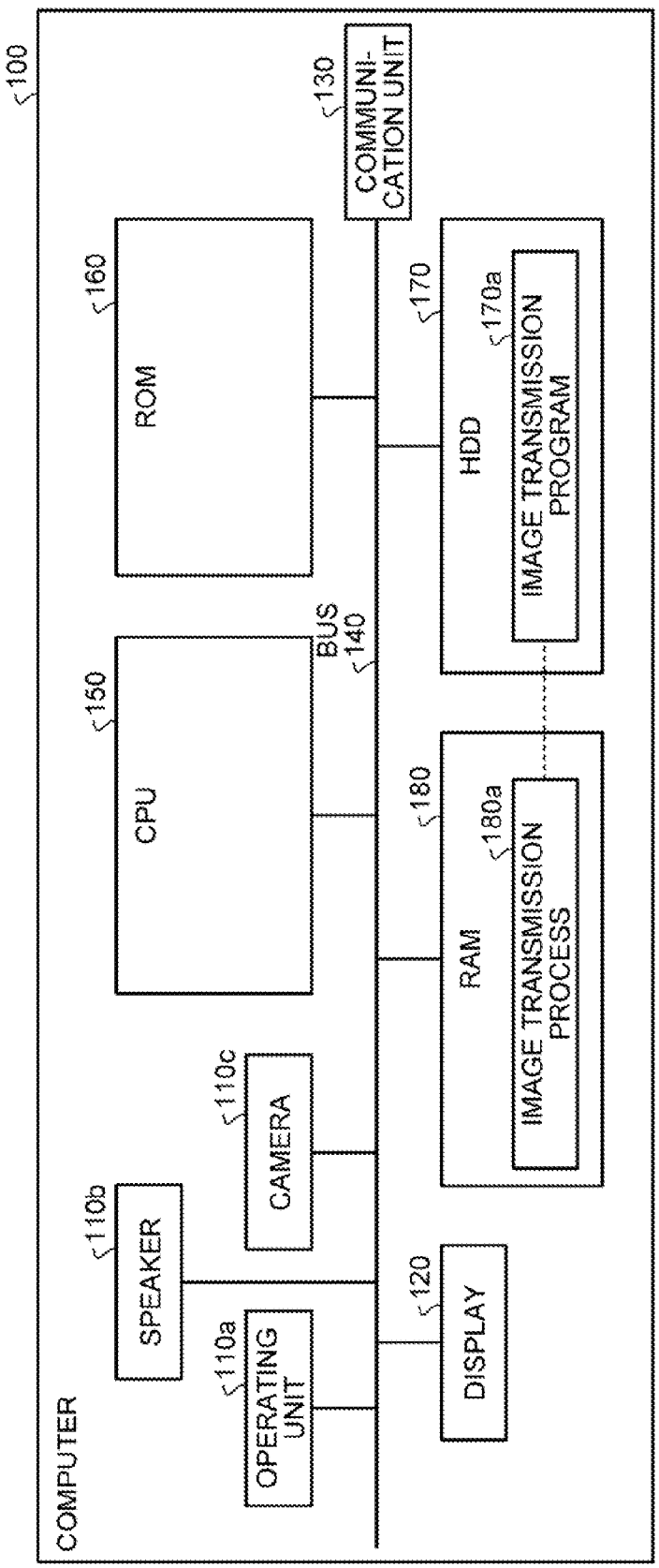

INFORMATION PROCESSING DEVICE USING COMPRESSION RATIO OF STILL AND MOVING IMAGE DATA

CROSS-REFERENCE TO RELATED APPLICATION

This application is based upon and claims the benefit of priority of the prior Japanese Patent Application No. 2011-278979, filed on Dec. 20, 2011, the entire contents of which are incorporated herein by reference.

FIELD

The embodiments discussed herein are related to an information processing device, an image transmission method, and recording medium.

BACKGROUND

A system called a thin client system is known. Thin client systems are configured so that a client is provided with only a minimum of functions and resources, such as applications, and files are managed by a server.

In a thin client system, a client acts as if it actually executes processes and stores data although it is in fact the server that makes the client display results of processes executed by the server or data stored in the server.

When transmitting screen data that is displayed on the client by the server in this way, a transmission delay may sometimes occur due to congestion in the network between the server and the client. This transmission delay of the network causes the drawing of screen data transmitted from the server to be delayed on the client side. Therefore, the response to operations executed on the client side becomes worse.

Incidentally, the following image coding device is used as an example of a technology for reducing the data amount of an image. To share a circuit in which there is an overlap between processes for encoding a moving image and a still image, the image coding device performs quantization capable of processing both the moving image and the still image by changing values of the moving image and the still image stored in a quantization table. For example, there is a video image compression method used in the following graphical user interface. In this compression method, when an input data stream is mixed media data in which multiple media, such as video images, texts, or images, are mixed, after metadata for each medium is obtained, the input data stream is divided into areas corresponding to each medium. Then, by referring to metadata in each medium, this compression method selects a compression algorithm suitable for compressing each area in the input data stream.

Patent Document 1: Japanese Laid-open Patent Publication No. 2000-050263

Patent Document 2: Japanese Laid-open Patent Publication No. 2007-043673

However, with the conventional technology, as described below, there is a problem in that it is not possible to prevent an increase in the amount of data transmission.

In general, the amount of encoded data obtained by performing compression encoding on a moving image can be smaller than that obtained by performing compression encoding on a still image; however, this relationship is not always established. For example, if a screen is a line drawing of a simple background, the amount of screen data may sometimes be smaller when using a compression format for a still image suitable for the line drawing than when using a compression format for a moving image that is advantageous for compressing an image containing many colors. In such a case, if the compression format for the moving image is continuously used, because the compression ratio of the screen data decreases when compared with a case in which the still image compression format is used, the amount of data transmission increases. However, with the conventional technology, because it is not possible to change the compression format selected when an image is input during a process, an increase in the amount of data transmission is not prevented.

SUMMARY

According to an aspect of an embodiment, an information processing device includes: an image memory that stores therein an image to be displayed on a terminal device that is connected through a network; and a processor coupled to the image memory, wherein the processor executes a process including: drawing a processing result from software into the image memory; detecting an update area containing an update between frames in the image; first performing still image compression on the image in the update area; first calculating a compression ratio of still image compressed data in the update area; identifying a high-frequency change area in which a frequency of changes between the frames in the image exceeds a predetermined frequency; second performing moving image compression on the image in the high-frequency change area; second calculating a compression ratio of moving image compressed data in the high-frequency change area; first transmitting, to the terminal device, the still image compressed data in the update area and the moving image compressed data in the high-frequency change area; and stopping the moving image compression based on the result of comparing the compression ratio of the moving image compressed data in the high-frequency change area and a compression ratio of still image compressed data in a previous update area that is the update area in a previous frame detected before the start of the moving image compression and has been detected at a position associated with the high-frequency change area.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a block diagram depicting the functional construction of each device contained in a thin client system according to a first embodiment;

FIG. 2 is a diagram depicting the outline of division of a desktop screen;

FIG. 4 is a diagram depicting the outline of correction of a mesh joint body;

FIG. 5 is a diagram depicting the outline of combination of candidates of a high-frequency change area;

FIG. 9 is a diagram depicting a specific example of a screen shift;

FIG. 12 is a flowchart (2) depicting the flow of the image transmission process according to the first embodiment;

FIG. 15 is a diagram depicting an example of a computer for executing an image transmission program according to the first embodiment and a second embodiment.

DESCRIPTION OF EMBODIMENTS

Figure 3A:
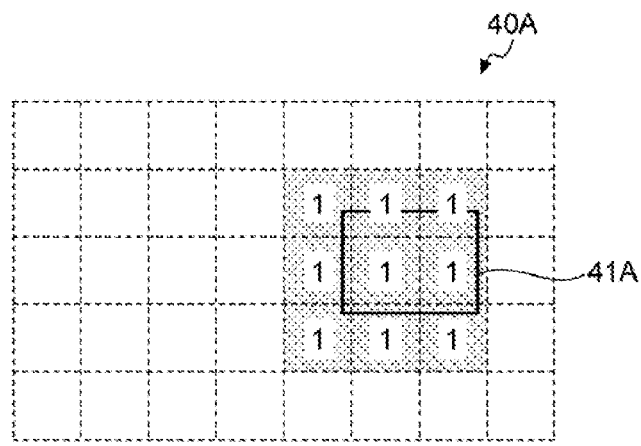
FIG. 3A is a diagram depicting the outline of determination of the change frequency of the desktop screen.

Preferred embodiments will be explained with reference to accompanying drawings. The disclosed technology is not limited to the embodiments. Furthermore, the embodiments can be appropriately used in combination as long as processes do not conflict with each other.

[a] First Embodiment
System Construction

First, the construction of a thin client system according to the present embodiment will be described. FIG. 1 is a block diagram depicting the functional construction of each device contained in the thin client system according to the first embodiment.

In a thin client system 1, as depicted in FIG. 1, the screen (display frame) displayed by a client terminal 20 is remotely controlled by a server device 10. That is, in the thin client system 1, the client terminal 20 acts as if it actually executes processes and stores data although it is in fact the server device 10 that makes the client terminal 20 display results of processes executed by the server device 10 and data stored in the server device.

As depicted in FIG. 1, the thin client system 1 has the server device 10 and the client terminal 20. In the example of FIG. 1, one client terminal 20 is connected to one server device 10. However, any number of client terminals may be connected to one server device 10.

The server device 10 and the client terminal 20 are connected to each other through a predetermined network so that they can mutually communicate with each other. Any kind of communication network, such as the Internet, LAN (Local Area Network) and VPN (Virtual Private Network), may be adopted as the network irrespective of the network being wired or wireless. It is assumed that an RFB (Remote Frame Buffer) protocol in Virtual Network Computing (VNC) is adopted as the communication protocol between the server device 10 and the client terminal 20, for example.

The server device 10 is a computer that supplies a service to remotely control a screen that is to be displayed on the client terminal 20. An application for remote screen control for servers is installed or pre-installed on the server device 10. In the following description, the application for remote screen control for servers will be referred to as "the remote screen control application on the server side".

The remote screen control application on the server side has a function of supplying a remote screen control service as a basic function. For example, the remote screen control application on the server side obtains operation information at the client terminal 20 and then makes an application operating in the device on the server side execute processes requested by the operation based on the operation information. Furthermore, the remote screen control application on the server side generates a screen for displaying results of the process executed by the application and then transmits the generated screen to the client terminal 20. At this point, the remote screen control application on the server side transmits the area that is changed and that corresponds to an assembly of pixels at a portion at which a bit map image displayed on the client terminal 20 before a present screen is generated, i.e., the remote screen control application on the server side transmits an image of an update rectangle. In the following description, a case where the image of the updated portion is formed as a rectangular image will be described as an example. However, the disclosed device is applicable to a case where the updated portion has a shape other than that of a rectangular shape.

In addition, the remote screen control application on the server side also has a function of compressing data of a portion having a large inter-frame motion to compression type data suitable for moving images and then transmitting the compressed data to the client terminal 20. For example, the remote screen control application on the server side divides a desktop screen to be displayed by the client terminal 20 into multiple areas and monitors the frequency of changes for each of the divided areas. At this point, the remote screen control application on the server side transmits attribute information on an area having a change frequency exceeding a threshold value, i.e., a high-frequency change area, to the client terminal 20. In addition to this process, the remote screen control application on the server side encodes the bit map image in the high-frequency change area to Moving Picture Experts Group (MPEG) type data, e.g., MPEG-2 or MPEG-4, and then transmits the encoded data to the client terminal 20. In the embodiment, the compression to the MPEG (Moving Image Experts Group) type data is described as an example. However, this embodiment is not limited to this style, and, for example, any compression encoding system such as Motion-JPEG (Joint Photographic Experts Group) may be adopted insofar as it is a compression type suitable for moving images.

The client terminal 20 is a computer on a reception side that receives a remote screen control service from the server device 10. A fixed terminal such as a personal computer or a mobile terminal such as a cellular phone, PHS (Personal Handyphone System) or PDA (Personal Digital Assistant) may be adopted as an example of the client terminal 20. A remote screen control application suitable for a client is installed or pre-installed in the client terminal 20. In the following description, the application for remote screen control for a client will be referred to as a "remote screen control application on the client side".

The remote screen control application on the client side has a function of notifying the server device 10 of operation information received through various kinds of input devices, such as a mouse and a keyboard. For example, the remote screen control application on the client side notifies the server device 10, as operation information, of right or left clicks, double clicks or dragging by the mouse and the amount of movement of the mouse cursor obtained through a moving operation of the mouse. For another example, the amount of rotation of a mouse wheel, the type of pushed key of the keyboard and the like are also notified to the server device 10 as operation information.

Furthermore, the remote screen control application on the client side has a function of displaying images received from the server device 10 on a predetermined display unit. For example, when a bit map image of an update rectangle is received from the server device 10, the remote screen control application on the client side displays the image of the update rectangle while the image concerned is positioned at a changed portion of the previously displayed bit map image. For another example, when attribute information on a high-frequency change area is received from the server device 10, the remote screen control application on the client side sets the area on the display screen corresponding to the position contained in the attribute information as a blank area that is not a display target of the bit map image (hereinafter referred to as an "out-of-display-target"). Under this condition, when receiving the encoded data of the moving image, the remote screen control application on the client side decodes the data concerned and then displays the decoded data on the blank area.

Construction of Server Device

Next, the functional construction of the server device according to this embodiment will be described. As depicted in FIG. 1, the server device 10 has an OS execution controller 11a, an application execution controller 11b, a graphic driver 12, a frame buffer 13, and a remote screen controller 14. In the example of FIG. 1, it is assumed that the thin client system contains various kinds of functional units provided to an existing computer, for example, functions such as various kinds of input devices and display devices in addition to the functional units depicted in FIG. 1.

The OS execution controller 11a is a processor for controlling the execution of an OS (Operating System). For example, the OS execution controller 11a detects a start instruction of an application and a command for the application from operation information that is obtained by an operation information obtaining unit 14a, described later. For example, when detecting a double click on an icon of an application, the OS execution controller 11a instructs the application execution controller 11b, described later, to start the application corresponding to that icon. Furthermore, when detecting an operation requesting execution of a command on an operation screen of an application being operated, i.e., on a so called window, the OS execution controller 11a instructs the application execution controller 11b to execute the command.

The application execution controller 11b is a processor for controlling the execution of an application based on an instruction from the OS execution controller 11a. For example, the application execution controller 11b operates an application when the application is instructed to start by the OS execution controller 11a or when an application under operation is instructed to perform a command. The application execution controller 11b requests the graphic driver 12, described later, to draw a display image of a processing result obtained through the execution of the application on the frame buffer 13. When the graphic driver 12, as described above, is requested to draw, the application execution controller 11b notifies the graphic driver 12 of a display image together with the drawing position.

The application executed by the application execution controller 11b may be pre-installed or installed after the server device 10 is shipped. Furthermore, the application may be an application operating in a network environment such as JAVA (registered trademark).

The graphic driver 12 is a processor for executing a drawing process on the frame buffer 13. For example, when accepting a drawing request from the application execution controller 11b, the graphic driver 12 draws the display image as a processing result of the application in a bit map format at a drawing position on the frame buffer 13 that is specified by the application. In the above, a case has been described as an example in which the drawing request is accepted via the application. However, a drawing request may be accepted from the OS execution controller 11a. For example, when accepting a drawing request based on the mouse cursor movement from the OS execution controller 11a, the graphic driver 12 draws a display image based on the mouse cursor movement in a bit map format at a drawing position on the frame buffer 13 that is indicated by OS.

The frame buffer 13 is a memory device for storing a bit map image drawn by the graphic driver 12. A semiconductor memory element such as a video random access memory (VRAM), a random access memory (RAM), a read only memory (ROM), or a flash memory is known as an example of the frame buffer 13. A memory device such as a hard disk or an optical disk may be adopted as the frame buffer 13.

The remote screen controller 14 is a processor for supplying a remote screen control service to the client terminal 20 through the remote screen control application on the server side. As depicted in FIG. 1, the remote screen controller 14 has an operation information obtaining unit 14a, a screen generator 14b, a change frequency determining unit 14c, and a high-frequency change area identifying unit 14d. Furthermore, the remote screen controller 14 has a first encoder 14e, a first transmitter 14f, a second encoder 14g, and a second transmitter 14h. Furthermore, the remote screen controller 14 has a calculating unit 14j, a stop controller 14k, and an overwrite controller 14m.

The operation information obtaining unit 14a is a processor for obtaining operation information from the client terminal 20. Right or left clicks, double clicks or dragging by the mouse and the amount of movement of the mouse cursor obtained through a moving operation of the mouse are examples of the operation information. Furthermore, the amount of rotation of a mouse wheel, the type of a pushed key of the keyboard, and the like are also examples of the operation information.

The screen generator 14b is a processor for generating a screen image to be displayed on a display unit 22 of the client terminal 20. For example, the screen generator 14b starts the following process every time an update interval of the desktop screen, for example, 33 milliseconds (msec) elapses. Namely, the screen generator 14b compares the desktop screen displayed on the client terminal 20 at the previous frame generation time with the desktop screen written on the frame buffer 13 at the present frame generation time. The screen generator 14b joins and combines pixels at a changed portion of the previous frame and shapes the changed portion in a rectangular shape to generate an image of an update rectangle, and the screen generator 14b then generates a packet for transmission of the update rectangle.

The change frequency determining unit 14c is a processor for determining the inter-frame change frequency of every divided area of the desktop screen. For example, the change frequency determining unit 14c accumulates an update rectangle generated by the screen generator 14b in a working internal memory (not depicted) over a predetermined period. At this point, the change frequency determining unit 14c accumulates attribute information capable of specifying the position and the size of the update rectangle, for example, the coordinates of the apex of the upper left corner of the update rectangle and the width and the height of the update rectangle. The period for which the update rectangle is accumulated correlates with the identification precision of the high-frequency change area, and erroneous detection of the high-frequency change area is reduced more when the period is longer. In this embodiment, it is assumed that the image of the update rectangle is accumulated over 33 msec, for example.

At this point, when a predetermined period has elapsed after the accumulation of the image of the update rectangle, the change frequency determining unit 14c determines the change frequency of the desktop screen with a map obtained by dividing the desktop screen to be displayed on the client terminal 20 in a mesh-like fashion.

FIG. 2 is a diagram depicting the outline of division of the desktop screen. Reference numeral 30 in FIG. 2 represents a change frequency determining map. Reference numeral 31 in FIG. 2 represents a mesh contained in the map 30. Reference numeral 32 in FIG. 2 represents one pixel contained in a pixel block forming the mesh 31. In the example depicted in FIG. 2, it is assumed that the change frequency determining unit 14c divides the map 30 into blocks so that each block of 8 pixels×8 pixels out of the pixels occupying the map 30 is set as one mesh. In this case, 64 pixels are contained one mesh.

Here, the change frequency determining unit 14c successively develops the image of the update rectangle on the map for determining the change frequency in accordance with the position and the size of the updated rectangle accumulated in the working internal memory. The change frequency determining unit 14c accumulates and adds the number of changes of the mesh at a portion overlapping with the update rectangle on the map every time the update rectangle is developed onto the map. At this point, when the update rectangle developed on the map is overlapped with the pixels contained in the mesh over a predetermined number of times, the change frequency determining unit 14c increments the number of changes of the mesh by 1. In this embodiment, a description will be given of a case in which, when the update rectangle is overlapped with at least one pixel contained in the mesh, the number of changes of the mesh is incremented.

Figure 3B:
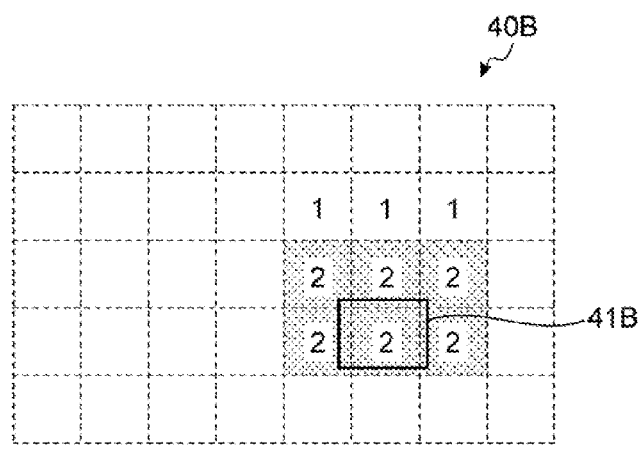
FIG. 3B is another diagram depicting the outline of determination of the change frequency of the desktop screen.
Figure 3C:
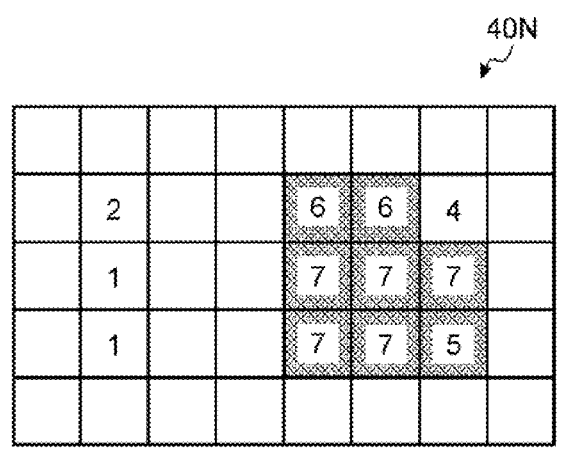
FIG. 3C is another diagram depicting the outline of determination of the change frequency of the desktop screen.

FIGS. 3A to 3C are diagrams depicting the outline of determination of the change frequency of the desktop screen. Reference numerals 40A, 40B, and 40N in FIGS. 3A to 3C represent the change frequency determining maps. Reference numerals 41A and 41B in FIGS. 3A and 3B, respectively, represent update rectangles. In this embodiment, numerals depicted in meshes of the map 40A represent the change frequencies of the meshes at the time point at which the update rectangle 41A is developed. Furthermore, numerals depicted in meshes of the map 40B represent the change frequencies of the meshes at the time point at which the update rectangle 41B is developed. Furthermore, numerals depicted in meshes of the map 40N represent the change frequencies of the meshes at the time point at which all update rectangles accumulated in the working internal memory are developed. In FIGS. 3A to 3C, it is assumed that the number of changes of a mesh in which no numeral is depicted is zero.

As depicted in FIG. 3A, when the update rectangle 41A is developed on the map 40A, the mesh of a hatched portion is overlapped with the update rectangle 41A. Therefore, the change frequency determining unit 14c increments the update frequency of the mesh of the hatched portions one by one. In this case, because the number of changes of each mesh is equal to zero, the number of changes of the hatched portion is incremented from 0 to 1. Furthermore, as depicted in FIG. 3B, when the update rectangle 41B is developed on the map 40B, the mesh of a hatched portion is overlapped with the update rectangle 41B. Therefore, the change frequency determining unit 14c increments the number of changes of the mesh of the hatched portions one by one. In this case, the change frequency of each mesh is equal to 1, and thus the number of changes of the hatched portion is incremented from 1 to 2. At the stage that all of the update rectangles are developed on the map as described above, the result of the map 40N depicted in FIG. 3C is obtained.

When the development of all the update rectangles accumulated in the working internal memory on the map is finished, the change frequency determining unit 14c obtains a mesh in which the number of changes, i.e., the change frequency for the predetermined period, exceeds a threshold value. This means that, in the example of FIG. 3C, the mesh of a hatched portion is obtained when the threshold value is set to "4". As the threshold value is set to a higher value, a portion at which moving images are displayed on the desktop screen with high probability can be encoded by the second encoder 14g, described later. With respect to the "threshold value", an end user may select a value which is stepwise set by a developer of the remote screen control application, or an end user may directly set a value.

The high-frequency change area identifying unit 14d is a processor for identifying, as a high-frequency change area, an area that is changed with high frequency on the desktop screen displayed on the client terminal 20.

Specifically, when meshes whose number of changes exceeds the threshold value are obtained by the change frequency determining unit 14c, the high-frequency change area identifying unit 14d corrects a mesh joint body obtained by joining adjacent meshes to a rectangle. For example, the high-frequency change area identifying unit 14d derives an interpolation area to be interpolated in the mesh joint body and then the interpolation area is added to the joint body, whereby the mesh joint body is corrected to a rectangle. An algorithm for deriving an area with which the joint body of meshes can be shaped to a rectangle by the minimum interpolation is applied to derive the interpolation area.

FIG. 4 is a diagram depicting the outline of correction of the mesh joint body. Reference numeral 51 in FIG. 4 represents a mesh joint body before correction, reference numeral 52 in FIG. 4 represents an interpolation area, and reference numeral 53 in FIG. 4 represents a rectangle after the correction. As depicted in FIG. 4, by adding the interpolation area 52 to the mesh joint body 51, the high-frequency change area identifying unit 14d corrects the mesh joint body 51 such that the mesh joint body 51 becomes the rectangle 53. At this stage, the synthesis of a rectangle, described later, has not been completed, and the rectangle 53 has not yet been settled as the high-frequency change area. Therefore, the rectangle after the correction is sometimes referred to as a "candidate of the high-frequency change area".

When multiple candidates of the high-frequency change area are present, the high-frequency change area identifying unit 14d synthesizes a rectangle containing multiple candidates of the high-frequency change area in which the distance between the candidates is equal to or less than a predetermined value. The distance between the candidates mentioned here represents the shortest distance between the rectangles after correction. For example, the high-frequency change area identifying unit 14d derives an interpolation area to be filled among the respective candidates when the candidates of the high-frequency change area are combined with one another and then adds the interpolation area to the candidates of the high-frequency change area, thereby synthesizing the rectangle containing the candidates of the high-frequency change area. An algorithm for deriving an area in which the candidates of the high-frequency change area are shaped into a combination body by the minimum interpolation is applied to derive the interpolation area.

FIG. 5 is a diagram depicting the outline of combination of candidates of a high-frequency change area. Reference numerals 61A and 61B in FIG. 5 represent candidates of the high-frequency change area, reference numeral 62 in FIG. 5 represents an interpolation area, and reference numeral 63 in FIG. 5 represents a combination body of the candidate 61A of the high-frequency change area and the candidate 61B of the high-frequency change area. As depicted in FIG. 5, the high-frequency change area identifying unit 14d adds the interpolation area 62 to the candidate 61A of the high-frequency change area and to the candidate 61B of the high-frequency change area, the distance between which is equal to or less than a distance d, thereby synthesizing the combination body 63 containing the candidate 61A of the high-frequency change area and the candidate 61B of the high-frequency change area. The high-frequency change area identifying unit 14d identifies the thus-obtained combination body as the high-frequency change area.

When identifying the high-frequency change area as described above, the high-frequency change area identifying unit 14d transmits, to the client terminal 20, attribute information with which the position and the size of the high-frequency change area can be specified, whereby the portion corresponding to the high-frequency change area in the bit map image of the desktop screen displayed on the client terminal 20 is displayed as a blank. Thereafter, the high-frequency change area identifying unit 14d clears the number of changes of the meshes mapped in the working internal memory. The high-frequency change area identifying unit 14d registers the attribute information on the high-frequency change area in the working internal memory.

Figure 6A:
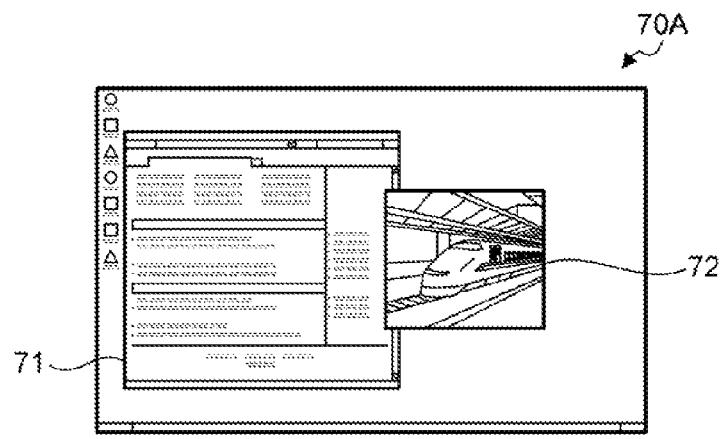
FIG. 6A is a diagram depicting the outline of notification of attribute information on the high-frequency change area.
Figure 6B:
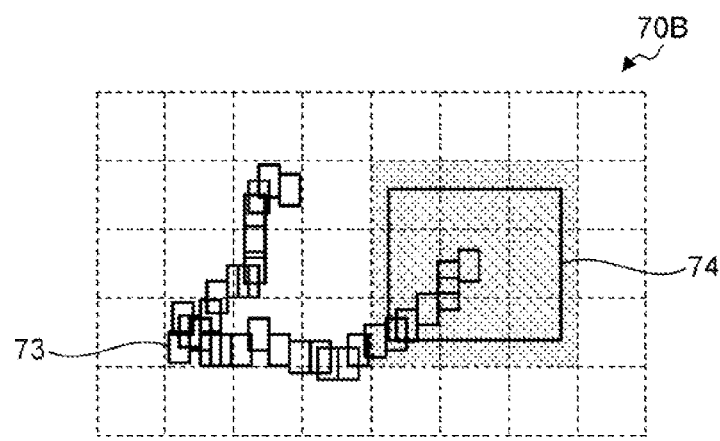
FIG. 6B is another diagram depicting the outline of notification of the attribute information on the high-frequency change area.
Figure 6C:
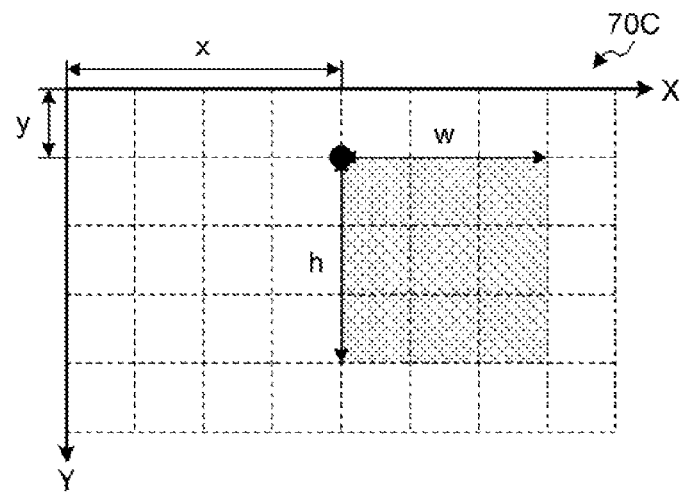
FIG. 6C is another diagram depicting the outline of notification of the attribute information on the high-frequency change area.

FIGS. 6A to 6C are diagrams depicting the outline of notification of the attribute information on the high-frequency change area. Reference numeral 70A in FIG. 6A represents an example of the desktop screen drawn on the frame buffer 13, and reference numerals 70B and 70C in FIGS. 6B to 6C represent change frequency determining maps. Reference numeral 71 in FIG. 6A represents a browser screen (window), reference numeral 72 in FIG. 6A represents a moving image reproducing screen, reference numeral 73 in FIG. 6B represents a movement locus of the mouse, and reference numeral 74 in FIG. 6B represents a moving image reproducing area using an application.

As depicted in FIG. 6A, the desktop screen 70A contains the browser screen 71 and the moving image reproducing screen 72. When a time-dependent variation is pursued from the desktop screen 70A, no update rectangle is detected on the browser screen 71 as a still image and update rectangles associated with the movement locus 73 of the mouse and the moving image reproducing area 74 are detected, as depicted in FIG. 6B. In this case, it is assumed that a mesh in which the number of changes exceeds the threshold value in the moving image reproducing area 74, i.e., a hatched portion in FIG. 6B, is identified by the high-frequency change area identifying unit 14d. In this case, the high-frequency change area identifying unit 14d transmits, to the client terminal 20, the coordinates (x,y) of the apex at the upper left corner of the high-frequency change area of the hatched portion in FIG. 6C and the width w and the height h of the high-frequency change area as the attribute information on the high-frequency change area.

In this embodiment, the coordinates of the apex at the upper left corner are adopted as a point for specifying the position of the high-frequency change area, but another apex may be adopted. Any point other than the apex, for example, the center of gravity, may be adopted as long as it can specify the position of the high-frequency change area. Furthermore, the upper left corner on the screen is set as the origin of the coordinate axes X and Y, but any point within the screen or outside of the screen may also be adopted as the origin.

When a high-frequency change area is detected at a part of a desktop screen as described above, animation of the moving pictures of the high-frequency change area on the desktop screen is started. In this case, the high-frequency change area identifying unit 14d inputs a bit map image of the portion corresponding to the high-frequency change area out of the bit map image drawn on the frame buffer 13 to the second encoder 14g, which will be described later. Furthermore, after the high-frequency change area has been detected, from the viewpoint of suppressing the state in which the animation is frequently changed between ON and OFF, the animation in the high-frequency change area is continued for a predetermined moving image end period e.g., for one second, until a high-frequency change area is not detected. In this case, even when an area is not identified as a high-frequency change area, the animation of the previously identified high-frequency change area is executed on. On the other hand, even if a high-frequency change area is detected, the animation is stopped by the stop controller 14k, which will be described later, when the average value Mr of the compression ratios of encoded data on moving images, which are obtained when the moving images are compressed, becomes worse than the average value Sr of the compression ratios of encoded data on the still images, which are obtained when the still images are compressed. Furthermore, an update rectangle that is not contained in the high-frequency change area is compressed using a still image compression format as in the case of the stage before the animation of moving images is started. That is, the image of the update rectangle that is not contained in the high-frequency change area out of the bit map image drawn on the frame buffer 13 is input to the first encoder 14e, described later.

The first encoder 14e is a processor for encoding an image of the update rectangle input by the screen generator 14b by using a compression format for a still image. For example, the first encoder 14e encodes an image of each update rectangle into still image encoded data by compressing using, for example, the Graphic Interchange Format (GIF) or Portable Network Graphics (PNG) format. In this example, GIF and PNG are exemplified as the still image compression format; however, another format may also be applied. When using an image of an object that is drawn using a wire frame in a Computer-Aided Design (CAD) system, when using an image of an object whose surface is filled with a solid color or when using document creating software or spreadsheet software, these compression formats tend to have a higher compression efficiency than that of JPEG.

The first transmitter 14f is a processor for transmitting the encoded data of the update rectangle encoded by the first encoder 14e to the client terminal 20. When the update rectangle is transmitted, the transmission protocol is, for example, Transmission Control Protocol/Internet Protocol (TCP/IP). Alternatively, User Datagram Protocol (UDP) may also be used.

The second encoder 14g is a processor for encoding an image input from the high-frequency change area identifying unit 14d in a moving image compression format. For example, the second encoder 14g compresses an image in a high-frequency change area using MPEG, thereby encoding the image into encoded data on a moving image. In this example, MPEG is exemplified as the moving image compression format; however, another format, such as Motion-JPEG, may also be applied.

The second transmitter 14h is a processor for transmitting the encoded data of the moving image encoded by the second encoder 14g to the client terminal 20. For example, the Real-time Transport Protocol (RTP) can be used for a communication protocol used when an encoded image in the high-frequency change area.

At this point, in general, the size of encoded data obtained by performing compression encoding on a moving image can be smaller than that obtained by performing compression encoding on a still image; however, this relationship is not always established. For example, if a screen is a line drawing of a simple background, the size of screen data may sometimes be smaller when using PNG or the like, which is a compression format for a still image suitable for the line drawing, than when using MPEG, which is a compression format for a moving image that is advantageous for compressing an image containing many colors.

Figure 7A:
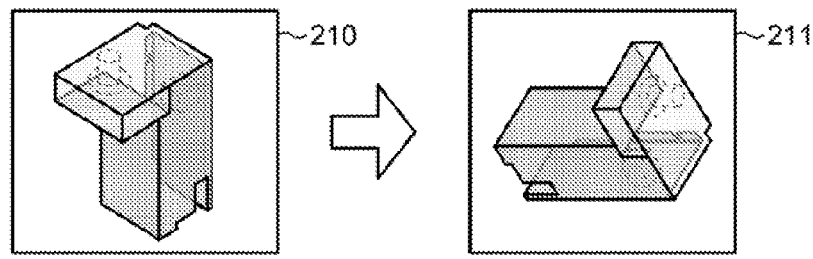
FIG. 7A is a diagram depicting an example of a screen shift when a rotating operation is performed on an object.
Figure 7B:
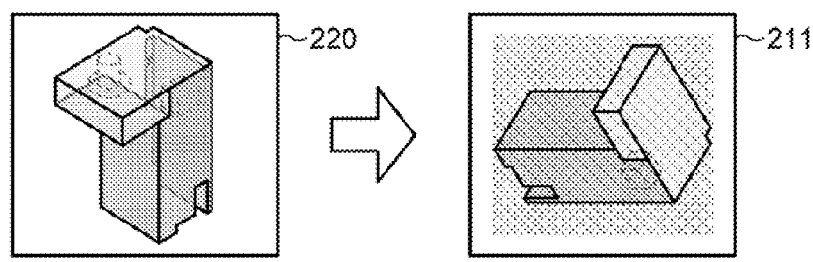
FIG. 7B is a diagram depicting an example of a screen shift when a rotating operation is performed on an object.

FIGS. 7A to 7D are diagrams each depicting an example of a screen shift when a rotating operation is performed on an object. FIGS. 7A to 7D each depict a case, as an example, in which a rotating operation is performed on an object, such as a product or a part constituting the product, when designing/drawing software, such as Computer-Aided Design (CAD) software, is being executed. FIGS. 7A and 7B each depicts shading model in which an object is drawn by a shading method using, for example, a polygon, whereas, FIGS. 7C and 7D each depicts a wire frame model in which an object is drawn in a linear manner. Furthermore, FIG. 7A and FIG. 7C each depict a case, as an example, in which encoded data on a still image obtained from the start to the end of the rotation of an object is transmitted to the client terminal 20. Furthermore, FIGS. 7B and 7D each depict a case, as an example, in which encoded data on a moving image obtained after animation starts in the middle of the rotation of an object is transmitted to the client terminal 20.

Figure 7C:
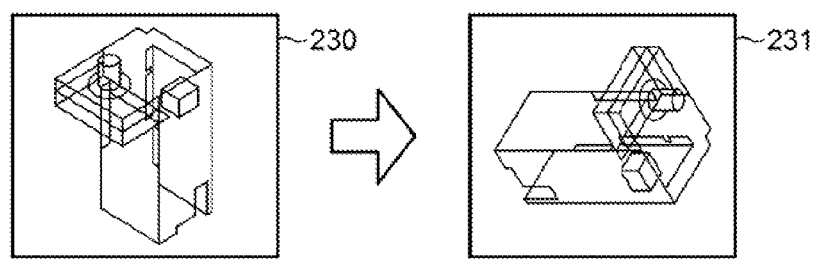
FIG. 7C is a diagram depicting an example of a screen shift when a rotating operation is performed on an object.
Figure 7D:
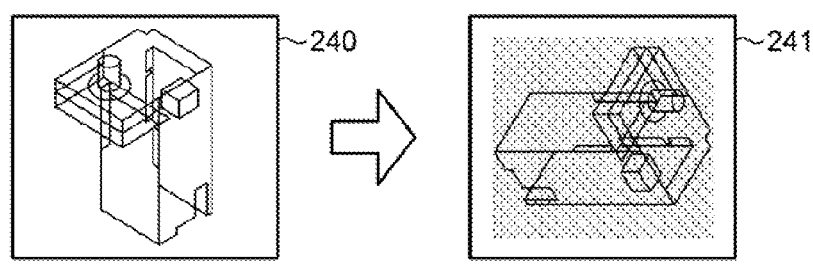
FIG. 7D is a diagram depicting an example of a screen shift when a rotating operation is performed on an object.
Figure 8A:
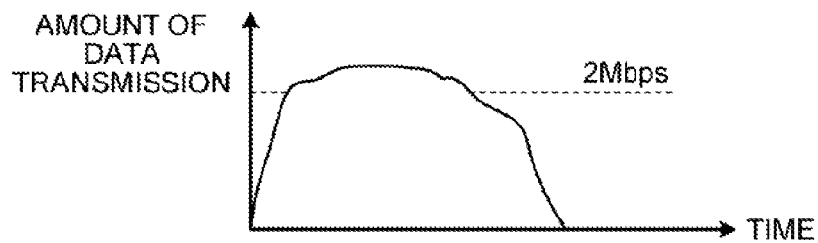
FIG. 8A is a graph depicting an example of the relationship between the amount of data transmission and the time when a rotating operation is performed on an object.
Figure 8B:
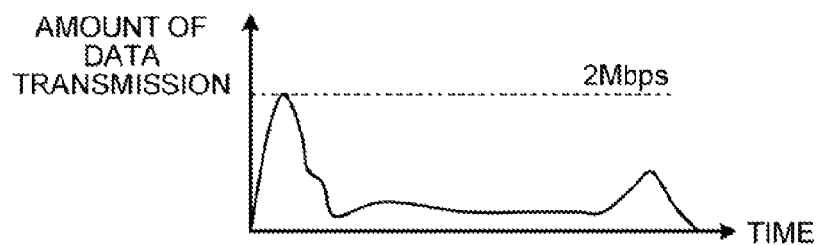
FIG. 8B is a graph depicting an example of the relationship between the amount of data transmission and the time when a rotating operation is performed on an object.
Figure 8C:
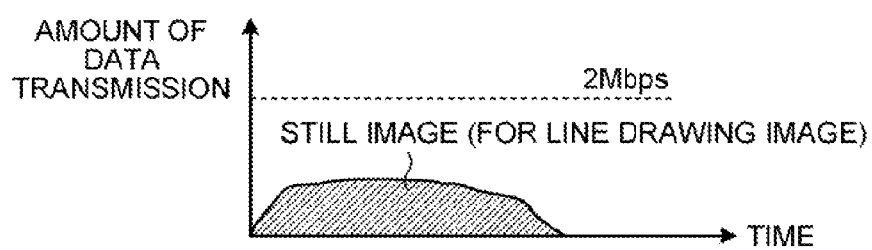
FIG. 8C is a graph depicting an example of the relationship between the amount of data transmission and the time when a rotating operation is performed on an object.
Figure 8D:
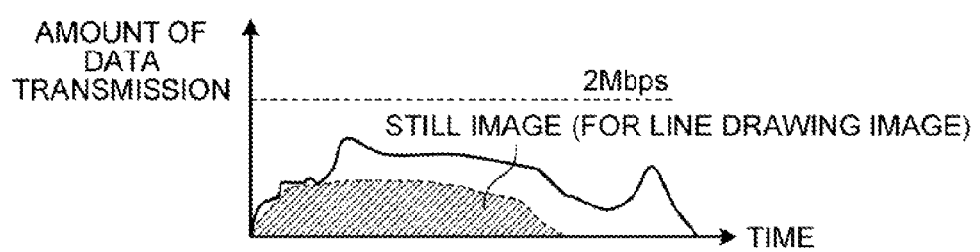
FIG. 8D is a graph depicting an example of the relationship between the amount of data transmission and the time when a rotating operation is performed on an object.

FIGS. 8A to 8D are graphs each depicting an example of the relationship between the amount of data transmission and the time for which a rotating operation is performed on an object. The vertical axis of the graph in each of FIGS. 8A to 8D indicates the amount of data transmission between the server device 10 and the client terminal 20 and the horizontal axis thereof indicates the time. The graph depicted in FIG. 8A is associated with the screen shift depicted in FIG. 7A, the graph depicted in FIG. 8B is associated with the screen shift depicted in FIG. 7B, the graph depicted in FIG. 8C is associated with the screen shift depicted in FIG. 7C, and the graph depicted in FIG. 8D is associated with the screen shift depicted in FIG. 7D.

As depicted in FIG. 7A, it is assumed that a rotating operation starts on an object that is drawn, by using shading, on a black background in a CAD window 210 developed by CAD software and assumed that the object is rotated to the orientation depicted in a CAD window 211. In the example depicted in FIG. 7A, encoded data on a still image compressed using PNG obtained from the start to the end of the rotation of the object is transmitted to the client terminal 20. Accordingly, degradation of image quality does not occur from the start to the end of the object. In such a case, as depicted in FIG. 8A, the amount of data transmitted per second exceeds 2 Mbps at some points from the start to the end of the rotation of the object.

In contrast, as depicted in FIG. 7B, it is assumed that a rotating operation starts on an object that is drawn, by using shading, on a black background in a CAD window 220 and assumed that the object is rotated to the orientation depicted in a CAD window 221. In the example depicted in FIG. 7B, encoded data on a moving image, which is obtained by compressing a shading model object using MPEG in the middle of the rotation of the object, is transmitted to the client terminal 20. Accordingly, because the encoded data on the moving image is transmitted in the middle of the rotation of the object, the quality of the image of the object in the CAD window 221 is slightly degraded compared with that in the CAD window 220. In contrast, when an object that is rendered using shading with many colors is used, moving image compression is efficiently performed by MPEG. Accordingly, as depicted in FIG. 8B, from the midpoint of the rotation, the reduction in the amount of data transmission can be greater than that of the encoded data on the still image depicted in FIG. 8A. As described above, in general, the size of encoded data obtained by performing compression encoding on a moving image can be smaller than that obtained by performing compression encoding on a still image.

Furthermore, as depicted in FIG. 7C, it is assumed that a rotating operation starts on an object that is drawn, by using a wire frame, on a black background in a CAD window 230 developed by CAD software and it is assumed that the object is rotated to the orientation depicted in a CAD window 231. In the example depicted in FIG. 7C, encoded data on a still image compressed using PNG obtained from the start to the end of the rotation of the object is transmitted to the client terminal 20. Accordingly, degradation of image quality does not occur from the start to the end of the object. Furthermore, when PNG or the like, which is a still image compression format suitable for a line drawing, is used for an object rendered using wire frames with a small number of colors, a still image is efficiently compressed when compared with a case in which a still image compression format, such as JPEG, is used. Accordingly, as depicted in FIG. 8C, the amount of data transmitted per second from the start to the end of the rotation of the object is kept to less than 1 Mbps.

In contrast, as depicted in FIG. 7D, it is assumed that a rotating operation starts on an object that is drawn, by using a wire frame, on a black background in a CAD window 240 and it is assumed that the object is rotated to the orientation depicted in a CAD window 241. In the example depicted in FIG. 7D, encoded data on a moving image, which is obtained by compressing a wire frame model object using MPEG in the middle of the rotation of the object, is transmitted to the client terminal 20. Accordingly, because the encoded data on the moving image is transmitted in the middle of the rotation of the object, the quality of the image of the object in the CAD window 241 is slightly degraded compared with that in the CAD window 240. Furthermore, when an object that is rendered by wire frames having a small number of colors is used, MPEG, in which a high compression ratio is obtained by removing high-frequency components from among the color frequency components constituting an image, is unsuitable. Accordingly, as depicted in FIG. 8D, even if MPEG is used for an image in a high-frequency change area, a moving image is not efficiently compressed; therefore, in some cases, the amount of data transmission may be greater than that of the encoded data on the still image depicted in FIG. 8C.

As described above, in the first embodiment, if moving image compression is performed on an image that is unsuitable for MPEG, animation is stopped by the stop controller 14k, which will be described later, and the image is compressed by the first encoder 14e using PNG.

The calculating unit 14j is a processor for calculating various parameters, such as the compression ratio of a still image or a moving image, that are used for determining whether moving image compression, i.e., animation, performed by the second encoder 14g is to be stopped.

For example, when an image of an update rectangle is encoded by the first encoder 14e into encoded data on a still image, the calculating unit 14j calculates the average value Sr of the compression ratios of still images related to the update rectangle. The average value Sr of the compression ratios is obtained by averaging the compression ratio of the update rectangle of the current frame and the compression ratios of the update rectangles of a predetermined number of frames that have been calculated before the compression ratio of the current frame is calculated and that were located at positions associated with the update rectangles. The average value Sr of the compression ratios is calculated for each update rectangle that is input by the screen generator 14b.

For example, first, the calculating unit 14j calculates the compression ratio of the current frame by dividing the amount of encoded data on the still image encoded by the first encoder 14e by the amount of data on the image of the update rectangle generated by the screen generator 14b. Then, the calculating unit 14j stores the compression ratio of the update rectangle of the current frame calculated as described above in a working internal memory (not depicted) by associating the compression ratio with the identification information on the current frame, identification information on the update rectangle, and the position and the size of the update rectangle. Then, by averaging the compression ratio of the current frame and the compression ratios of a predetermined number of frames, e.g., two frames previously calculated, that have been calculated before the compression ratio of the current frame is calculated, the calculating unit 14j calculates the average value Sr of the compression ratios of the still images related to the update rectangle. At this point, from among the update rectangles in two frames previously stored in the working internal memory, the calculating unit 14j uses, for the averaging, the compression ratios of the update rectangles overlapping with the update rectangle of the current frame. If there are multiple update rectangles overlapping with the position of the update rectangle in the current frame, the update rectangle having the maximum area is used to average the compression ratios.

In this example, a description has been given of a case in which the compression ratio is calculated by dividing the amount of data on the compressed image by the amount of data on the image that has not been compressed; however, the method for calculating the compression ratio is not limited thereto. For example, the calculating unit 14j may also calculate the compression ratio by dividing the difference between the amount of data of the images obtained before the compression and after the compression by the amount of data on the image that has not been compressed. Furthermore, in this example, a description has been given of a case in which the average value Sr of the compression ratio is calculated by averaging, using the arithmetic average, the compression ratio of the current frame and the compression ratios of the previous frames; however, the method for calculating the average value is not limited thereto. For example, the calculating unit 14j may also calculate the average value Sr of the compression ratio by averaging, using a weighted average, the compression ratio of the current frame and the compression ratios of the previous frames by increasing weighting the closer a frame to the current frame.

For another example, when the second encoder 14g encodes an image in a high-frequency change area into an encoded data on a moving image, the calculating unit 14j calculates the average value Mr of the compression ratios of the moving images in the high-frequency change area.

At this point, before calculating the average value Mr of the compression ratios of the moving images, the calculating unit 14j counts the number of colors contained in an image in a high-frequency change area. Then, the calculating unit 14j determines whether the number of colors in the high-frequency change area is equal to or less than a predetermined threshold value, for example, 64 colors. The reason for determining whether the number of colors in the high-frequency change area is equal to or less than the threshold value in this way is to determine whether the image in the high-frequency change area is an image unsuitable for MPEG, i.e., an image suitable for a line drawing in a still image compression format, such as PNG. An example of the threshold value includes a value indicating a high possibility of a line drawing image on a simple background, for example, 64 colors.

At this point, if the number of colors in the high-frequency change area exceeds the threshold value, it is determined that the number of colors in the image in the high-frequency change area is greater than that of the line drawing on a simple background; therefore, it can be determined that the image is suitable for MPEG, i.e., it can be determined that the image is unsuitable for a line drawing in a still image compression format. In such a case, because there is no need to stop moving image compression performed on the image in the high-frequency change area, the average value Mr of the compression ratios of the moving image that is used to stop the moving image compression is not calculated. Accordingly, the stop controller 14k does not compare the average value Sr of the compression ratios of the still images with the average value Mr of the compression ratios of the moving images and does not execute the stop control on the moving image compression.

In contrast, if the number of colors in the high-frequency change area is equal to or less than the threshold value, it is determined that the number of colors in the image in the high-frequency change area is the same as that of the line drawing on a simple background; therefore, it can be determined that the image is unsuitable for MPEG, i.e., it can be determined that the image is suitable for a line drawing in a still image compression format.

In such a case, the calculating unit 14j shifts its operation to calculating the average value Mr of the compression ratios of the moving images. The average value Mr of the compression ratio described above is the averaged value of the compression ratio of the current frame in the high-frequency change area and the compression ratios of a predetermined number of frames, in the high-frequency change area, that have been calculated before the compression ratio of the current frame is calculated. The average value Mr of the compression ratios is calculated for each high-frequency change area that is input by the high-frequency change area identifying unit 14d.

Specifically, the calculating unit 14j calculates the compression ratio of the current frame by dividing the amount of encoded data on the moving image encoded by the second encoder 14g by the amount of data on the image in the high-frequency change area identified by the high-frequency change area identifying unit 14d. Then, the calculating unit 14j stores the compression ratio of the current frame in the high-frequency change area calculated as described above in a working internal memory (not depicted) such that the compression ratio is associated with the identification information on the frame, the identification information on the high-frequency change area, and the position and the size of the frame. Then, by averaging the compression ratio of the current frame and the compression ratios of a predetermined number of frames, e.g., two previously calculated frames, that have been calculated before the compression ratios of the current frame is calculated, the calculating unit 14j calculates the average value Mr of the compression ratios of the moving image related to the high-frequency change area. At this point, for the compression ratios of the previous two frames in the high-frequency change area stored in the working internal memory, the calculating unit 14j uses only the compression ratio of a Predictive picture (P picture) for the averaging without using the compression ratio of an Intra-coded picture (I picture).

The reason for using only P pictures to average the compression ratios in this way is that the performance of the moving image compression using MPEG is significantly indicated compared with that of an I picture that is closer to the original image. Accordingly, by using only the P pictures to average the compression ratios, it is possible to allow the stop controller 14k, described later, to determine whether the moving image compression is stopped by using a small number of frames when compared with a case in which the averaging is performed with the inclusion of including I pictures. Furthermore, immediately after the moving image compression is performed on I pictures, the compression performance of the P pictures is less likely to be stable; therefore, it may also be possible to use, for the averaging, the compression ratio of a P picture located in few frames after an I picture. If a group of pictures (GOP) in MPEG is constituted by an I picture, a P picture, and a Bi-directionally Picture (B picture), the compression ratio of the B picture may also be used for the averaging.

The stop controller 14k is a processor for stopping the moving image compression performed by the second encoder 14g. For example, the stop controller 14k allows the second encoder 14g to stop the moving image compression based on the result of comparing the compression ratio Mr of the moving image compressed data in the high-frequency change area and a compression ratio Sr of still image compressed data in a previous update area that is the update area in a previous frame detected before the start of the moving image compression and has been detected at a position associated with the high-frequency change area.

Specifically, when the calculating unit 14j calculates the average value Mr of the compression ratios of moving images, the stop controller 14k determines whether the average value Mr of the compression ratios of the moving images can be used to stop the moving image compression. More specifically, the stop controller 14k determines whether the average value Mr of the compression ratios of the moving images is calculated from the compression ratio of a predetermined number of frames, three frames in this example, in the high-frequency change area. If the average value Mr of the compression ratios of the moving images is calculated from the frames, the number of which is less than the predetermined number, the stop controller 14k postpones determining whether to stop the moving image compression until the predetermined number of compression ratios are obtained.

In contrast, if it is determined that the average value Mr of the compression ratios of the moving images can be used to stop the moving image compression, the stop controller 14k determines whether the average value Sr of the compression ratios of the still images is less than the multiplied value "Mr*α" obtained by multiplying the average value Mr of the compression ratios of the moving images by a predetermined coefficient α. Accordingly, the stop controller 14k determines whether to stop the moving image compression and return the compression to the still image compression. A value for which it is worth returning to the still image compression is used for the above described coefficient α obtained by multiplying the average value Mr of the compression ratios of the moving images by the coefficient α and by comparing it with the average value Sr of the compression ratios of the still images. Specifically, if there is no big difference between the average value of the compression ratios of the moving images and that of the still images, there is a high possibility that a sample that has worsened by coincidence is possibly used to determine whether to stop the moving image compression. Accordingly, the coefficient α described above is preferably set, for example, such that the average value Mr of the compression ratios of the moving images is twice the average value Sr of the compression ratios of the still images.

At this point, if the average value Sr of the compression ratios of the still images is less than the multiplied value "Mr*α", it can be determined that it is worth returning to the still image compression by stopping the moving image compression. Accordingly, the stop controller 14k sets an animation stop flag stored in the working internal memory (not depicted) to ON. In contrast, if the average value Sr of the compression ratios of the still images is equal to or greater than the multiplied value "Mr*α", it can be determined that this is an efficient state in the moving image compression using MPEG. Accordingly, in such a case, the animation stop flag is not set to ON. The "animation stop flag" mentioned here is a flag indicating whether the animation is stopped. For example, if the animation stop flag is ON, even when a high-frequency change area is identified, still image compression is performed on an image of an update rectangle without performing the moving image compression. In contrast, if the animation stop flag is OFF, the moving image compression to be performed on the image in the high-frequency change area is not stopped.

The overwrite controller 14m is a processor for transmitting, to the client terminal 20 when the moving image compression ends, an overwrite image that is overwritten in a high-frequency change area, to which encoded data on a moving image is transmitted when the moving image was being performed, and that is subjected to still image compression.

For example, if an overwrite standby time, for example, five seconds has elapsed after the animation stop flag is set to ON, i.e., if the animation is stopped, the overwrite controller 14m starts an overwrite process using the still image. Furthermore, if the moving image end period has elapsed after a high-frequency change area is not identified and if the overwrite standby time has elapsed, i.e., if the animation ends, the overwrite controller 14m also starts the overwrite process using the still image.

Specifically, from among high-frequency change areas to which encoded data on moving images are transmitted by the second transmitter 14h when the moving image compression was being performed by the second encoder 14g, the overwrite controller 14m extracts, as an overwrite area, an area to which an image of an update rectangle has not been transmitted after the stopping or the end of the moving image compression. At this point, if an overwrite area is present, the overwrite controller 14m allows the first encoder 14e to encode the image in the overwrite area into encoded data on a still image and then allows the first transmitter 14f to transmit the encoded data on the overwrite image to the client terminal 20. The transmission of the image in the overwrite area is independently performed regardless of whether an update rectangle is generated by the screen generator 14b.

By doing so, the quality of an image on the desktop screen in the client terminal 20 that becomes worse than a still image due to the animation can be overwritten by the still image. Accordingly, it is possible to display a desktop screen, in which the degradation of image quality is suppressed, when the animation ends and when the degradation of image quality is easily identified, whereas a coarse desktop screen is displayed when the animation is being performed during which the degradation of the image quality is less obvious.

Furthermore, because, in a high-frequency change area, only the area in which an image of an update rectangle has not been transmitted is transmitted to the client terminal 20 as an overwrite area, the amount of data transmission can be reduced when compared with a case in which the entire high-frequency change area is used as an overwrite area.

Various kinds of integrated circuits and electronic circuits may be adopted for the OS execution controller 11a, the application execution controller 11b, the graphic driver 12 and the remote screen controller 14. Some of the functional units contained in the remote screen controller 14 may be implemented by other integrated circuits or electronic circuits. For example, an application specific integrated circuit (ASIC) or a field programmable gate array (FPGA) may be adopted as the integrated circuits. Furthermore, a central processor unit (CPU), a micro processor unit (MPU), or the like may be adopted as the electronic circuit.

SPECIFIC EXAMPLE

Figure 10:
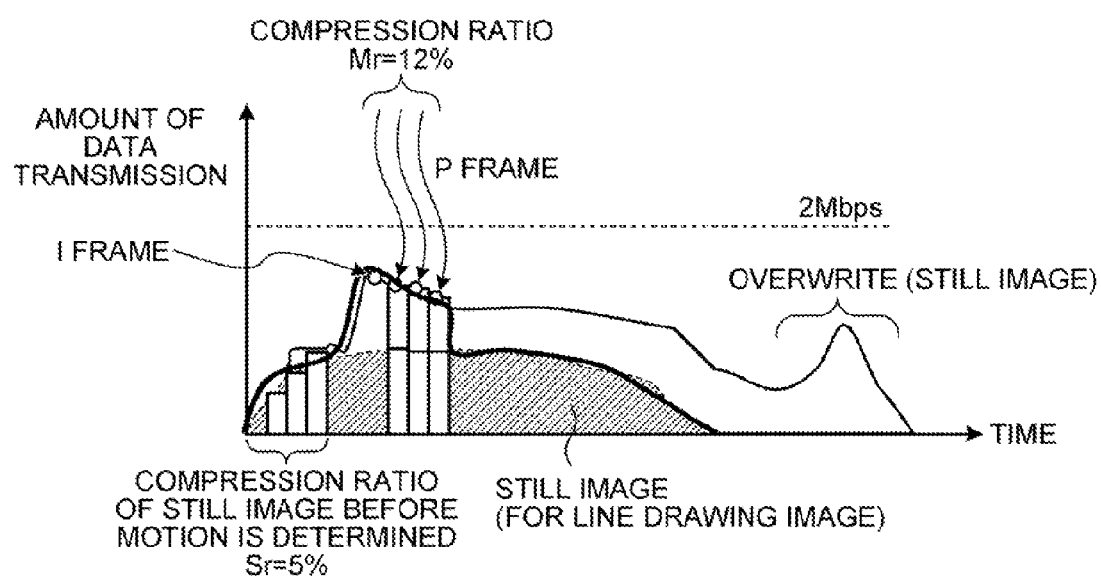
FIG. 10 is a graph depicting an example of the relationship between the amount of data transmission and the time when the screen depicted in FIG. 9 is shifted.

In the following, a specific example of a screen shift displayed on the client terminal 20 will be described with reference to FIGS. 9 and 10. FIG. 9 is a diagram depicting a specific example of a screen shift. FIG. 10 is a graph depicting an example of the relationship between the amount of data transmission and the time when the screen depicted in FIG. 9 is shifted. The vertical axis of the graph depicted in FIG. 10 indicates the amount of data transmission between the server device 10 and the client terminal 20 and the horizontal axis of the graph indicates the time. In the example depicted in FIG. 9, it is assumed that a rotating operation is performed on an object drawn, by using shading, on a black background in a CAD window developed by CAD software.

As depicted in FIG. 9, a rotating operation starts on an object drawn, by using a wire frame, on a black background in a CAD window 300. At this point, it is assumed that the change frequency in a neighboring area including the object becomes high and this area is identified as a high-frequency change area. Therefore, subsequently, the second encoder 14g encodes the image in the high-frequency change area using MPEG into encoded data on a moving image. However, for an object rendered by wire frames having a small number of colors, as depicted in FIG. 10, the moving image is not efficiently compressed even if MPEG is used for the image in the high-frequency change area. Accordingly, the amount of data transmission is greater than that for the encoded data of the still image.

Then, as depicted in FIG. 10, when the object is rotated to the orientation depicted in a CAD window 310, it is possible to obtain the average value Mr (=12%) of the compression ratios of the moving images calculated by using only the P pictures from the predetermined number of frames. At this point, as depicted in FIG. 10, if the average value Sr of the compression ratios of the still images before the animation is started is 5%, the average value Sr "5%" of the compression ratios of the still images is less than the multiplied value Mr*α "12%÷2=6%" obtained by multiplying the average value Mr of the compression ratios of the moving images by the coefficient α (=½). Accordingly, the animation stop flag is set to ON, and subsequently, the moving image compression of an image in the high-frequency change area is stopped, the still image compression is performed on an image of an update rectangle, and the image is transmitted. Consequently, the still image compression is efficiently performed on images of update rectangles containing a part or all of the objects rendered by wire frames by using PNG, which is the still image compression format suitable for a line drawing.

Then, when the object is rotated to the orientation depicted in a CAD window 320, the state becomes a no-operation state in which no operation is performed by a user. At this point, in the CAD window 320 in the client terminal 20, an area 320a and an area 320b, in which an image of an update rectangle is received after the animation is stopped, remains. Then, when an overwrite standby time, i.e., five seconds, has elapsed after the animation stop flag is set to ON, the image in the area 320a and the area 320b, to which the image of the update rectangle has not been transmitted, is subjected to the still image compression and is then transmitted to the client terminal 20. Accordingly, a CAD window 330, in which the encoded data of the moving image does not remain any more, is displayed.

As described above, even if the animation is performed in a high-frequency change area at least once, when the average value Mr of the compression ratios of the moving images becomes worse compared with the average value Sr of the compression ratios of the still images, the moving image compression is stopped and the compression returns to the still image compression. Accordingly, as depicted in FIG. 10, for an image unsuitable for moving image compression using MPEG, after stopping the moving image compression using MPEG, the still image compression is efficiently performed using PNG, which is a still image compression format suitable for a line drawing, thus suppressing an increase in the amount of data transmission. Furthermore, when the animation is stopped, the overwrite areas 320a and 320b, in each of which the encoded data on the moving image is displayed, are overwritten with the still images instead of the images of the update rectangles being transmitted. By overwriting an image with a still image, it is possible to display a desktop screen in which the degradation of the quality of image is reduced when degradation of the quality of the image is easily identified.

Construction of Client Terminal

Next, the functional construction of the client terminal according to this embodiment will be described. As depicted in FIG. 1, the client terminal 20 has an input unit 21, the display unit 22, and a remote screen controller 23 on the client side. In the example of FIG. 1, it is assumed that the various kinds of functional units with which an existing computer is provided, for example, functions, such as an audio output unit and the like, are provided in addition to the functional units depicted in FIG. 1.

The input unit 21 is an input device for accepting various kinds of information, for example, an instruction input to the remote screen controller 23 on the client side, which will be described later. For example, a keyboard or a mouse may be used. The display unit 22, described later, implements a pointing device function in cooperation with the mouse.

The display unit 22 is a display device for displaying various kinds of information, such as a desktop screen and the like, transmitted from the server device 10. For example, a monitor, a display, or a touch panel may be used for the display unit 22.

The remote screen controller 23 is a processor for receiving a remote screen control service supplied from the server device 10 through the remote screen control application on the client side. As depicted in FIG. 1, the remote screen controller 23 has an operation information notifying unit 23a, a first receiver 23b, a first decoder 23c, and a first display controller 23d. Furthermore, the remote screen controller 23 has a second receiver 23e, a second decoder 23f, and a second display controller 23g.

The operation information notifying unit 23a is a processor for notifying the server device 10 of operation information obtained from the input unit 21. For example, the operation information notifying unit 23a notifies the server device 10 of right or left clicks, double clicks and dragging by the mouse, the movement amount of the mouse cursor obtained through the moving operation of the mouse, and the like as operation information. As another example, the operation information notifying unit 23a notifies the server device 10 of the rotational amount of the mouse wheel, the type of a pushed key of the keyboard, and the like as the operation information.

The first receiver 23b is a processor for receiving the encoded data of the update rectangle transmitted by the first transmitter 14f in the server device 10. The first receiver 23b also receives the attribute information on the high-frequency change area transmitted by the high-frequency change area identifying unit 14d in the server device 10.

The first decoder 23c is a processor for decoding the encoded data of the update rectangle received by the first receiver 23b. A decoder having a decoding system that is suitable for the encoding system installed in the server device 10 is mounted in the first decoder 23c.

The first display controller 23d is a processor for making the display unit 22 display the image of the update rectangle decoded by the first decoder 23c. For example, the first display controller 23d makes the display unit 22 display the bit map image of the update rectangle on a screen area of the display unit 22 that corresponds to the position and the size contained in the attribute information on the update rectangle received by the first receiver 23b. Furthermore, when the attribute information on the high-frequency change area is received by the first receiver 23b, the first display controller 23d executes the following process. Namely, the first display controller 23d sets the screen area of the display unit 22 associated with the position and the size of the high-frequency change area contained in the attribute information on the high-frequency change area as a blank area that is out-of-target with respect to the displaying of the bit map image.

The second receiver 23e is a processor for receiving the encoded data on the moving images transmitted by the second transmitter 14h in the server device 10. The second receiver 23e also receives the attribute information on the high-frequency change area transmitted by the high-frequency change area identifying unit 14d in the server device 10.

The second decoder 23f is a processor for decoding the encoded data on the moving images received by the second receiver 23e. A decoder having a decoding system suitable for the encoding format installed in the server device 10 is mounted in the second decoder 23f.

The second display controller 23g is a processor for displaying, on the display unit 22, an image in a high-frequency change area decoded by the second decoder 23f based on the attribute information on the high-frequency change area received by the second receiver 23e. For example, the second display controller 23g reproduces a moving image for a high-frequency change area in a screen area in the display unit 22 that is associated with the position and the size of the high-frequency change area contained in the attribute information on the high-frequency change area.

Various kinds of integrated circuits and electronic circuits may be adopted for the remote screen controller 23 on the client side. Furthermore, some of the functional units contained in the remote screen controller 23 may be implemented by other integrated circuits or electronic circuits. For example, an ASIC or an FPGA may be adopted as an integrated circuit, and a CPU, an MPU, or the like may be adopted as an electronic circuit.

Flow of Process

Figure 11:
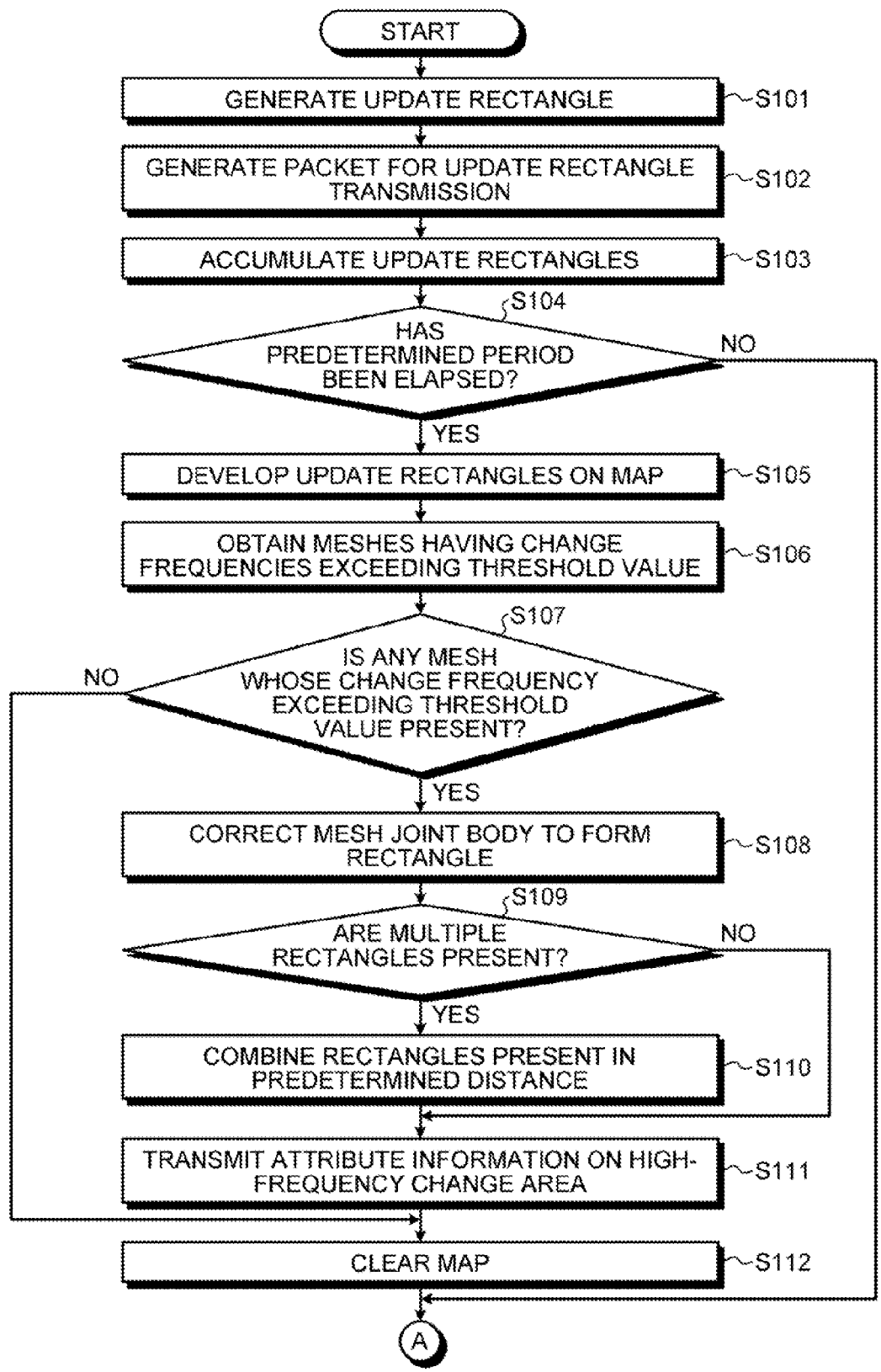
FIG. 11 is a flowchart (1) depicting the flow of an image transmission process according to a first embodiment.

Next, the flow of the process performed by the server device 10 according to the first embodiment will be described. FIGS. 11 to 12 are flowcharts depicting the flow of the image transmission process according to the first embodiment. The image transmission process is a process executed by the server device 10 and starts when bits map data is drawn on the frame buffer 13.

As depicted in FIG. 11, the screen generator 14b joins pixels at a portion changed from a previous frame and then generates an image of an update rectangle shaped into a rectangle (Step S101). Then, the screen generator 14b generates a packet for update rectangle transmission from a previously generated update rectangle image (Step S102).

Subsequently, the change frequency determining unit 14c accumulates the update rectangles generated by the screen generator 14b in to a working internal memory (not depicted) (Step S103). At this point, when a predetermined period has not elapsed from the start of the accumulation of update rectangle (No at Step S104), subsequent processes concerning identification of the high-frequency change area is skipped, and the process moves to Step S113, which will be described later.

On the other hand, when the predetermined period has elapsed from the start of the accumulation of the update rectangle (Yes at Step S104), the change frequency determining unit 14c executes the following process. Namely, the change frequency determining unit 14c successively develops the images of the update rectangles on the change frequency determining map according to the positions and the sizes of the update rectangles accumulated in the working internal memory (Step S105). Then, the change frequency determining unit 14c obtains meshes having change frequencies exceeding the threshold value out of the meshes contained in the change frequency determining map (Step S106).

Thereafter, the high-frequency change area identifying unit 14d the server device 10 determines whether any mesh whose change frequency exceeds the threshold value is obtained (Step S107). At this point, when no mesh whose change frequency exceeds the threshold value is present (No at Step S107), no high-frequency change area is present on the desktop screen. Therefore, the subsequent process concerning the identification of the high-frequency change area is skipped, and the process moves to Step S112.

On the other hand, when a mesh whose change area exceeds the threshold value is present (Yes at Step S107), the high-frequency change area identifying unit 14d corrects the mesh joint body obtained by joining adjacent meshes to form a rectangle (Step S108).

When multiple corrected rectangles, i.e., multiple high-frequency change area candidates are present (Yes at Step S109), the high-frequency change area identifying unit 14d executes the following process. Namely, the high-frequency change area identifying unit 14d combines corrected rectangles so as to synthesize a rectangle containing multiple high-frequency change area candidates that are spaced from one another at a predetermined distance value or less (Step S110). When multiple high-frequency change areas are not present (No at Step S109), the synthesis of the rectangle is not performed, and the process moves to Step S111.

Subsequently, the high-frequency change area identifying unit 14d transmits to the client terminal 20 the attribute information from which the position and the size of the high-frequency change area can be specified (Step S111). Then, the high-frequency change area identifying unit 14d clears the number of changes of the meshes mapped in the working internal memory (Step S112).

Then, as depicted in FIG. 12, if a high-frequency change area is identified (Yes at Step S113), the high-frequency change area identifying unit 14d determines whether the animation stop flag is set to ON (Step S115).

At this point, if the animation stop flag is not set to ON (No at Step S115), the second encoder 14g encodes the image in the high-frequency change area into encoded data on a moving image (Step S116).

Then, the calculating unit 14j determines whether the number of colors in the high-frequency change area is equal to or less than a predetermined threshold value (Step S117). If the number of colors in the high-frequency change area exceeds the threshold value (No at Step S117), it is determined that the number of colors in the image in the high-frequency change area is greater than that of a line drawing on a simple background. Accordingly, it is determined that the image is an image suitable for MPEG, i.e., an image unsuitable for a still image compression format that is suitable for a line drawing. In such a case, because there is no need to stop the moving image compression performed on the image in the high-frequency change area, processes performed at Steps S118 to Step S121 are skipped, and the process moves to Step S129.

In contrast, if the number of colors in the high-frequency change area is equal to or less than the threshold value (Yes at Step S117), it is determined that the number of colors in an image in the high-frequency change area is the same as that in a line drawing on a simple background. Accordingly, it is determined that the image is an image unsuitable for MPEG, i.e., it is an image suitable for the still image compression format suitable for a line drawing. In such a case, the calculating unit 14j calculates the average value Mr of the compression ratios of the moving images related to the high-frequency change area (Step S118).

Subsequently, the stop controller 14k determines whether the average value Mr of the compression ratios of the moving images is calculated from the compression ratios of the predetermined number of frames in the high-frequency change area, i.e., whether the average value Mr of the compression ratios of the moving images can be used to determine whether the moving image compression is stopped (Step S119).

At this point, if the average value Mr of the compression ratios of the moving images can be used to determine whether the moving image compression is stopped (Yes at Step S119), the stop controller 14k performs further determination.

Namely, the stop controller 14k determines whether the average value Sr of the compression ratios of the still images is less than the multiplied value "Mr*α" obtained by multiplying the average value Mr of the compression ratios of the moving images by the coefficient α (Step S120). In contrast, if the average value Mr of the compression ratios of the moving images is not used to determine whether the moving image compression is stopped (No at Step S119), the subsequent process is skipped in order to postpone determining whether the moving image compression is stopped until the compression ratios of the predetermined number of frames is obtained and then the process moves to Step S129.

At this point, if the average value Sr of the compression ratios of the still images is less than the multiplied value "Mr*α" (Yes at Step S120), it can be determined that it is worth stopping the moving image compression and returning to the still image compression. Accordingly, the stop controller 14k sets the animation stop flag stored in the working internal memory (not depicted) to ON (Step S121).

In contrast, if the average value Sr of the compression ratios of the still images is equal to or greater than the multiplied value "Mr*α" (No at Step S120), it can be determined that the moving image compression using MPEG is relatively efficient. Accordingly, in this case, the process moves to Step S129 without setting the animation stop flag to ON.

If a high-frequency change area is not identified (No at Step S113), the high-frequency change area identifying unit 14d transmits an overwrite image and determines whether the animation ends (Step S122). If the high-frequency change area identifying unit 14d determines that the overwrite image has been transmitted and that the animation ends (Yes at Step S122), the process moves to Step S129.

If the animation does not end (No at Step S122), the high-frequency change area identifying unit 14d determines whether the high-frequency change area is not continuously identified for the moving image end period, e.g., for one second (Step S123). If the high-frequency change area is not continuously identified for the moving image end period (No at Step S123), the process moves to Step S115 in order to continue the animation.

In contrast, if the high-frequency change area is not continuously identified for the moving image end period (Yes at Step S123), the overwrite controller 14m determines whether the overwrite standby time, e.g., five seconds, has elapsed after the moving image end period (Step S124).

Furthermore, if the moving image stop flag is set to ON (Yes at Step S115), the overwrite controller 14m determines whether the overwrite standby time has elapsed after the animation stop flag is set to ON (Step S124).

At this point, if the overwrite standby time has elapsed after the moving image end period or the overwrite standby time has elapsed after the animation stop flag is set to ON (Yes at Step S124), the overwrite controller 14m performs the following process. Namely, from among high-frequency change areas to which encoded data on moving images are transmitted when the moving image compression was being performed, the overwrite controller 14m extracts, as the overwrite area, an area to which an image of an update rectangle has not been transmitted after the stopping or the end of the moving image compression (Step S125).

If an overwrite area is present (Yes at Step S126), the overwrite controller 14m allows the first encoder 14e to encode the image in the overwrite area into encoded data on a still image (Step S127). At this point, the overwrite controller 14m sets the animation stop flag to OFF (Step S128).

Furthermore, if the overwrite standby time has not elapsed after the moving image end period or if the overwrite standby time has not elapsed after the animation stop flag is set to ON (No at Step S124), the process moves to Step S129.

If the update rectangle is present (Yes at Step S129), the first encoder 14e encodes the image of the update rectangle into encoded data on a still image (Step S130). Then, the calculating unit 14j calculates the average value Sr of the compression ratios of the still images related to the update rectangle (Step S131).

Then, the first transmitter 14f and the second transmitter 14h transmit the still image and/or the moving image encoded data to the client terminal 20 (Step S132) and end the process.

Advantage of the First Embodiment

As described above, when changing the transmission mode of the desktop screen from a still image to a moving image, the server device 10 according to the first embodiment compares the average value Sr of the compression ratios of still images with the average value Mr of the compression ratios of moving images. Then, if the average value Mr of the compression ratios of the moving images is low, the server device 10 according to the first embodiment returns the transmission mode of the screen to the still image from the moving image. Accordingly, with the server device 10 according to the first embodiment, if the average value Mr of the compression ratios of the moving images becomes worse than the average value Sr of the compression ratios of the still images even if the animation has been performed once, the moving image compression is stopped and the compression returns to the still image compression. Accordingly, the server device 10 according to the first embodiment stops the moving image compression and efficiently performs still image compression on an image unsuitable for the moving image compression by using a still image compression format suitable for a line drawing. Accordingly, the server device 10 according to the first embodiment can reduce an increase in the amount of data transmission.

[b] Second Embodiment

In the above explanation, a description has been given of the embodiment according to the present invention; however, the embodiment is not limited thereto and can be implemented with various kinds of embodiments other than the embodiment described above. Therefore, another embodiment included in the present invention will be described below.

Resume Animation

For example, in the first embodiment, if animation is stopped once, the overwrite process is executed without performing anything; however, the disclosed device is not limited thereto. For example, if the average value Sr of the compression ratios of the still images has a tendency to worsen even when the animation is stopped once, the disclosed device can resume the moving image compression on an image in a high-frequency change area by setting the animation stop flag to OFF. At this point, to prevent the animation stop flag from being frequently changed between ON and OFF, when the average value Sr of the compression ratios of the still images is equal to or greater than twice the previously calculated average value Mr of the compression ratios of the moving images, it is preferable to resume the moving image compression on the image in the high-frequency change area. By doing so, even if the compression ratio of the moving images temporarily drops, the moving image compression can be resumed in the high-frequency change area.

Extension of Map Clearing

For example, in the first embodiment described above, a description has been given of a case in which the high-frequency change area identifying unit 14d clears the change frequency determining map in conformity with (in synchronization with) the update rectangle accumulating period. However, the timing at which the change frequency determining map is cleared is not limited to thereto.

For example, even after the change frequency does not exceed the threshold value in an area identified as a high-frequency change area, the high-frequency change area identifying unit 14d can continuously identify the area as a high-frequency change area over a predetermined period.

Figure 13A:
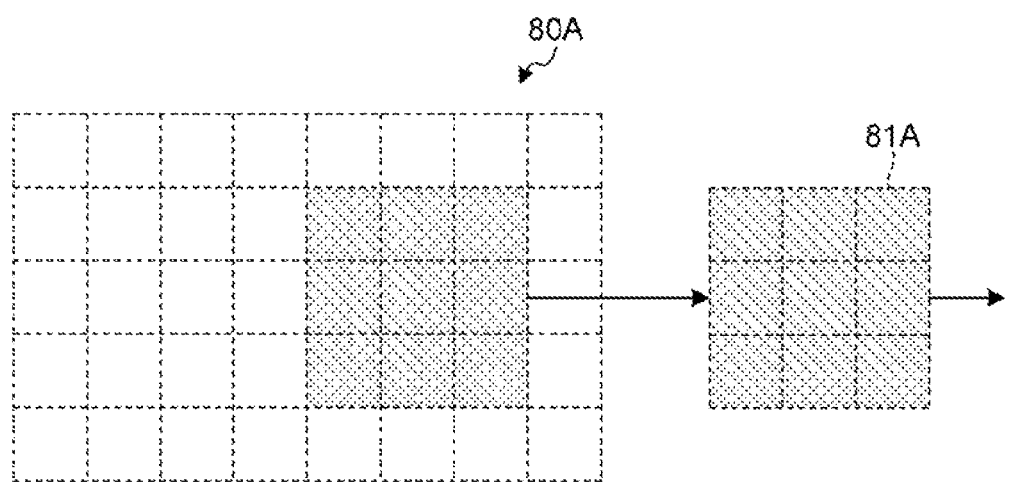
FIG. 13A is a diagram depicting the outline of an extension of map clearing.
Figure 13B:
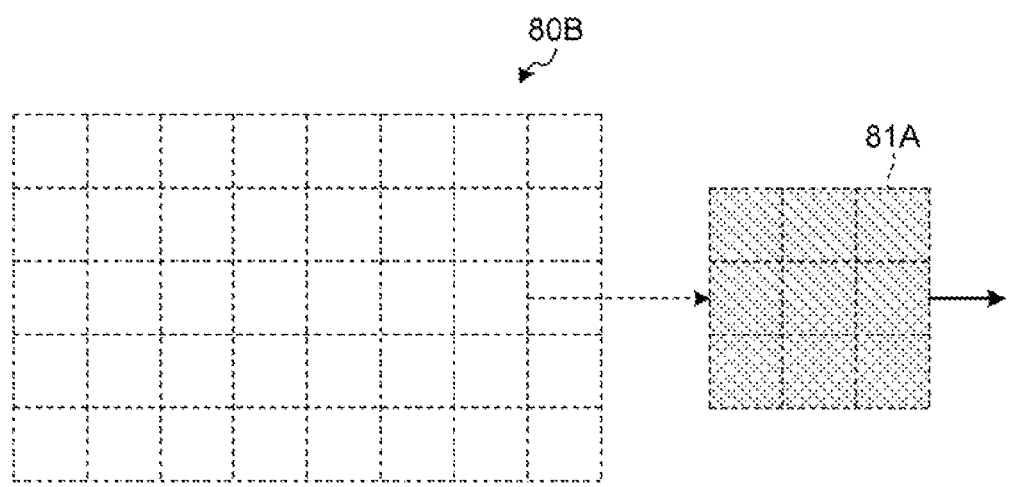
FIG. 13B is a diagram depicting the outline of an extension of map clearing.

FIGS. 13A and 13B are diagrams each depicting the outline of an extension of map clearing. FIG. 13A depicts a change frequency determining map 80A at the time point when a high-frequency change area is first identified and depicts an identification result 81A of the high-frequency change area at that time point. Furthermore, FIG. 13B depicts a change frequency determining map 80B at a specific time point within a predetermined period from the time when the high-frequency change area is first identified and depicts the identification result 81A of the high-frequency change area at that time point.

As depicted in FIG. 13A, when a mesh joint body having the number of changes exceeding a threshold value is obtained on the map 80A and the identification result 81A of a high-frequency change area is obtained, the identification result 81A is taken over for a predetermined period even when no mesh joint body having the number of changes exceeding the threshold value is subsequently obtained. Specifically, as depicted in FIG. 13B, the identification result 81A of the high-frequency change area is taken over as long as the time period is within the predetermined period after the identification result 81A of the high-frequency change area is first identified even when no mesh joint body having the number of changes exceeding the threshold value on the map 80B is obtained. An end user may select as the "threshold value" a value that is set stepwise by the developer of the remote screen control application on the server side, or the end user may directly set the "threshold value."

Accordingly, even when motion is intermittently stopped in an area where moving images are actually reproduced, the high-frequency change area is not intermittently identified, and thus frame drop of images can be prevented from intermittently occurring in the high-frequency change area. Furthermore, because the identification result of the high-frequency change area is taken over, the size of the high-frequency change area is stable. Therefore, the frequency at which parameters at the encoding time are initialized can be reduced, so the load imposed on the encoder can be reduced.

Suppression of Contraction of High-Frequency Change Area

For another example, the high-frequency change area identifying unit 14d executes the following process when an area identified as a high-frequency change area is more contractive than an area that was previously identified as the high-frequency change area. Namely, the high-frequency change area identifying unit 14d takes over the area previously-identified as the high-frequency change area as a present identification result when the degree of the contraction concerned is equal to or less than a predetermined threshold value.

Figure 14A:
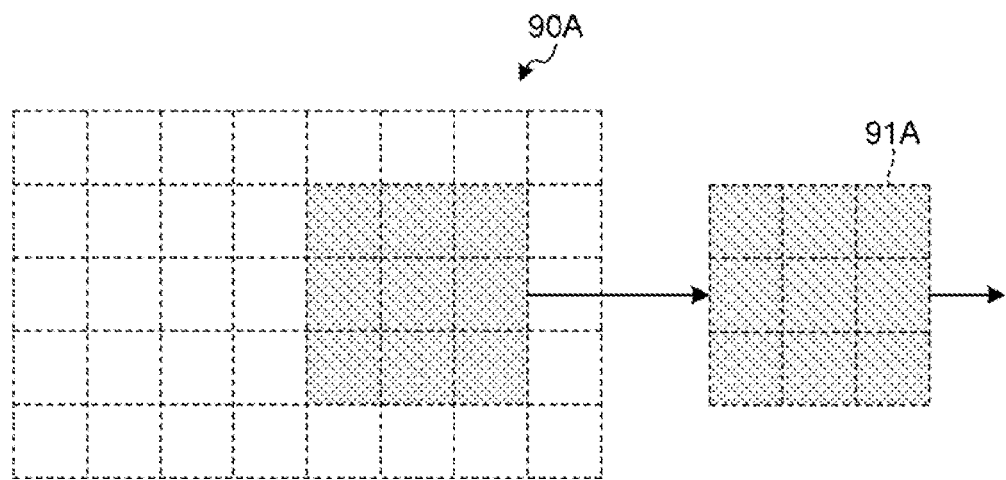
FIG. 14A is a diagram depicting the outline of the suppression of the contraction of a high-frequency change area.
Figure 14B:
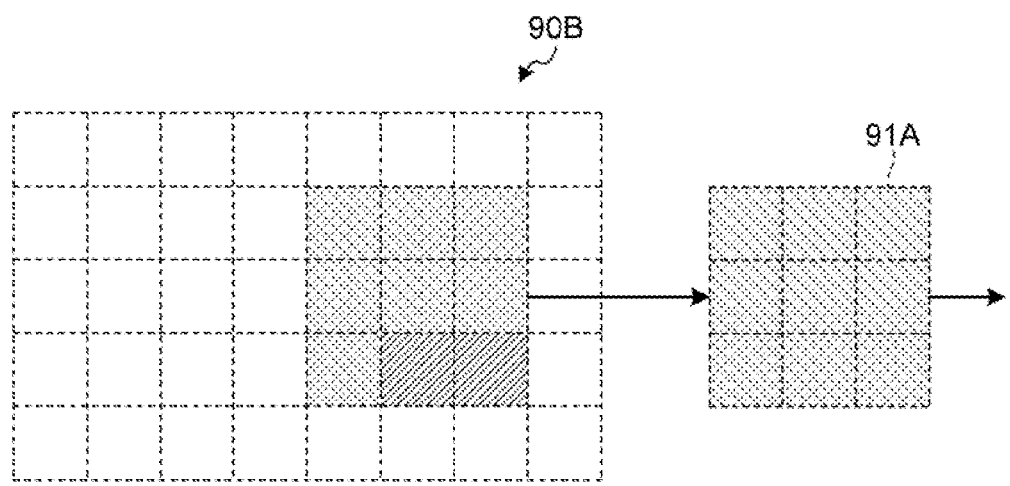
FIG. 14B is a diagram depicting the outline of the suppression of the contraction of a high-frequency change area.

FIGS. 14A and 14B are diagrams depicting the outline of suppression of the contraction of the high-frequency change area. FIG. 14A depicts a change frequency area determining map 90A and an identification result 91A of a high-frequency change area at a time point T1. FIG. 14B depicts a change frequency area determining map 90B and the identification result 91A of a high-frequency change area at a time point T2. The time point T1 and the time point T2 are assumed to satisfy T1<T2.

As depicted in FIG. 14A, if a mesh joint body having the number of changes exceeding a threshold value is obtained on the map 90A and if the identification result 91A of a high-frequency change area is obtained, the high-frequency change area is not immediately contracted even when the mesh joint body having the number of changes exceeding the threshold value is contracted. Specifically, as depicted in FIG. 14B, even when the mesh joint body having a number of changes exceeding the threshold value is contracted at a hatched portion thereof, the identification result 91A of the high-frequency change area is taken over under the condition that the contraction area of the hatched portion is equal to or less than a predetermined threshold value, for example, a half.

Accordingly, even when a part of the motion is intermittent in an area where moving images are actually reproduced, the high-frequency change area is not intermittently identified. Consequently, frame drop of images can be prevented from intermittently occurring in the high-frequency change area. Furthermore, because the identification result of the high-frequency change area is taken over, the size of the high-frequency change area is stable. Therefore, the initialization frequency of the parameters in the encoding operation can be reduced, and thus the load imposed on the encoder can be reduced.

Overwrite Area

In the first embodiment described above, a description has been given of a case in which, from among areas that were high-frequency change areas during the animation, an area to which an image of an update rectangle has not been transmitted is used as an overwrite area; however, the disclosed device is not limited thereto. For example, the disclosed device may also set all of the areas on the desktop screen to an overwrite area or set a high-frequency change area to an overwrite area.

Dispersion and Integration

The components of each unit illustrated in the drawings are only for conceptually illustrating the functions thereof and are not always physically configured as depicted in the drawings. In other words, the specific shape of a separate or integrated device is not limited to the drawings. Specifically, all or part of the device can be configured by functionally or physically separating or integrating any of the units depending on various loads or use conditions. For example, the image transmission process each executed by the first transmitter 14f and the second transmitter 14h of the server device 10 may also be integrally performed by one transmitter. Furthermore, the image receiving process each executed by the first receiver 23b and the second receiver 23e of the client terminal 20 may also be integrally performed by a single image receiver. Furthermore, the display control process each executed by the first display controller 23d and the second display controller 23g of the client terminal may also be performed by a single display controller.

Image Transmission Program

Various kinds of processes described in the embodiments described above may be implemented by executing programs written in advance for a computer such as a personal computer or a workstation. Therefore, in the following, an example of a computer that has the same functions as the above embodiments and executes an image transmission program will be described with reference to FIG. 15.

FIG. 15 is a diagram depicting an example of a computer for executing the image transmission program according to the first and second embodiments. As depicted in FIG. 15, a computer 100 has an operating unit 110a, a speaker 110b, a camera 110c, a display 120, and a communication unit 130. Furthermore, the computer 100 has a CPU 150, a ROM 160, an HDD 170, and a RAM 180. These devices 110 to 180 are connected to one another via a bus 140.

As depicted in FIG. 15, the HDD 170 stores therein, in advance an image transmission program 170a having the same function as that performed by the remote screen controller 14 on the server side described in the first embodiment. The image transmission program 170a may also be appropriately integrated or separated as in the case of the respective components of each of the remote screen controller 14 depicted in FIG. 1. Specifically, all the data stored in the HDD 170 does not always have to be stored in the HDD 170, and part of data for processes may be stored in the HDD 170.

The CPU 150 reads the image transmission program 170a from the HDD 170, and loads the read-out image transmission program 170a in the RAM 180. Accordingly, as depicted in FIG. 15, the image transmission program 170a functions as an image transmission process 180a. The image transmission process 180a arbitrarily loads various kinds of data read from the HDD 170 into corresponding areas allocated to the respective data in the RAM 180 and executes various kinds of processes based on the loaded data. The image transmission process 180a contains the processes executed by the remote screen controller 14 depicted in FIG. 1, for example, the processes depicted in FIGS. 11 to 12. Furthermore, for processors virtually implemented in the CPU 150, not all of the processors is needed to be always operated in the CPU 150 as long as only the processor needed to be processed is virtually implemented.

Furthermore, the image transmission program 170a does not always needs to be stored in the HDD 170 or the ROM 160 from the beginning. For example, each program may be stored in a "portable physical medium" such as a flexible disk, known as an FD, a CD-ROM, a DVD disk, a magneto optical disk or an IC card, that is to be inserted into the computer 100. Then, the computer 100 may obtain and execute each program from the portable physical medium. Furthermore, each program may be stored in another computer, a server device, or the like that is connected to the computer 100 through a public line, the Internet, LAN, WAN or the like, and the computer 100 may obtain each program from the other computer or the server device and execute the program.

According to one aspect of the information processing device disclosed in the present invention, an advantage is provided in that it is possible to reduce an increase in the amount of data transmission.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
    an image memory that stores therein an image to be displayed on a terminal device that is connected through a network; and
    a processor coupled to the image memory, wherein the processor executes a process comprising:
    drawing a processing result from software into the image memory;

detecting an update area containing an update between frames in the image;

first performing still image compression on the image in the update area;

first calculating a compression ratio of still image compressed data in the update area;

identifying a high-frequency change area in which a frequency of changes between the frames in the image exceeds a predetermined frequency;

second performing moving image compression on the image in the high-frequency change area;

second calculating a compression ratio of moving image compressed data in the high-frequency change area;

first transmitting, to the terminal device, the still image compressed data in the update area and the moving image compressed data in the high-frequency change area; and stopping the moving image compression based on the result of comparing the compression ratio of the moving image compressed data in the high-frequency change area and a compression ratio of still image compressed data in a previous update area that is the update area in a previous frame detected before the start of the moving image compression and has been detected at a position associated with the high-frequency change area.

2. The information processing device according to claim 1, wherein the processor executes the process further comprising:

third performing the still image compression on an image in an overwrite area in which the update area is not detected after the stopping, the overwrite area contained in the high-frequency change area;

second transmitting, to the terminal device, the still image compressed data in the overwrite area.

3. The information processing device according to claim 1, wherein the second calculating includes calculating, when the number of colors contained in the image in the high-frequency change area is equal to or less than a predetermined threshold value, the compression ratio of the moving image compressed data.

4. The information processing device according to 1, wherein the first calculating includes calculating an average value of compression ratios of still image compressed data among multiple frames in update areas, the second calculating includes calculating, from among multiple pieces of the moving image compressed data among the multiple frames, an average value of compression ratios of pictures other than an Intra (I) picture, and the stopping includes stopping, when the average value of the compression ratios of the pictures other than the I picture becomes worse than the average value of the compression ratios of the still image compressed data, the moving image compression performed at the second performing.

5. The information processing device according to 1, wherein the processor executes the process further comprising:

resuming, when the compression ratio of the still image compressed data in the update area has a tendency to worsen after the moving image compression stops at the stopping, the moving image compression on the high-frequency change area.

6. An image transmission method comprising:

drawing, using a processor, a processing result from software into an image memory that stores therein an image to be displayed on a terminal device that is connected via a network;

detecting, using the processor, an update area containing an update between frames in the image;

first performing still image compression on the image in the update area;

first calculating, using the processor, a compression ratio of still image compressed data in the update area;

identifying, using the processor, a high-frequency change area in which a frequency of changes between the frames in the image exceeds a predetermined frequency;

second performing moving image compression on the image in the high-frequency change area;

second calculating, using the processor, a compression ratio of moving image compressed data in the high-frequency change area;

transmitting, to the terminal device, the still image compressed data in the update area and the moving image compressed data in the high-frequency change area; and stopping, using the processor, the moving image compression based on the result of comparing the compression ratio of the moving image compressed data in the high-frequency change area and a compression ratio of still image compressed data in a previous update area that is the update area in a previous frame detected before the start of the moving image compression and has been detected at a position associated with the high-frequency change area.

7. A non-transitory computer readable recording medium having stored therein an image transmission program causing a computer to execute a process comprising: drawing a processing result from software into an image memory that stores therein an image to be displayed on a terminal device that is connected via a network; detecting an update area containing an update between frames in the image; first performing still image compression on the image in the update area; first calculating a compression ratio of still image compressed data in the update area; identifying a high-frequency change area in which a frequency of changes between the frames in the image exceeds a predetermined frequency; second performing moving image compression on the image in the high-frequency change area; second calculating a compression ratio of moving image compressed data in the high-frequency change area; transmitting, to the terminal device, the still image compressed data in the update area and the moving image compressed data in the high-frequency change area; and stopping the moving image compression based on the result of comparing the compression ratio of the moving image compressed data in the high-frequency change area and a compression ratio of still image compressed data in a previous update area that is the update area in a previous frame detected before the start of the moving image compression and has been detected at a position associated with the high-frequency change area.

* * * * *